United States Patent
Shinagawa et al.

(10) Patent No.: US 8,670,937 B2
(45) Date of Patent: Mar. 11, 2014

(54) PATH SEARCHING METHOD AND PATH SEARCH DEVICE

(71) Applicant: Fujitsu Limited, Kawasaki (JP)

(72) Inventors: Akio Shinagawa, Nakano (JP); Kyohei Tamai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/849,192

(22) Filed: Mar. 22, 2013

(65) Prior Publication Data

US 2013/0261967 A1    Oct. 3, 2013

(30) Foreign Application Priority Data

Mar. 28, 2012    (JP) ................. 2012-075169

(51) Int. Cl.
G01C 21/34    (2006.01)
(52) U.S. Cl.
USPC ............. 701/533; 701/411; 701/428
(58) Field of Classification Search
USPC ........................................ 701/533
See application file for complete search history.

(56) References Cited

U.S. PATENT DOCUMENTS 5,978,732 A * 11/1999 Kakitani et al. ............... 701/411
7,957,894 B2 * 6/2011 Wellmann ..................... 701/428
2012/0283948 A1 * 11/2012 Demiryurek et al. ......... 701/533

FOREIGN PATENT DOCUMENTS

JP    06-052237    2/1994
JP    2006-162273    6/2006

OTHER PUBLICATIONS

Kazuo Iwano; "The Basics of Algorithms," Information Science, Konseputsu 4, First Edition, First Copy, Oct. 30, 2010, pp. 86-101, with Partial English-language Translation.
Batz, Gernot Veit et al., "Time-Dependent Contraction Hierarchies and Approximation," Lecture Noted in Computer Science, vol. 6049, May 20, 2010, pp. 166-177, XP019142558.
Bulitko, Vadim et al., "Speeding Up Learning in Real-time Search via Automatic State Abstraction," Proceedings of the 20th National Conference on Artificial Intelligence, Jul. 9, 2005, pp. 1349-1354, XP55072689.
Delling, Daniel et al., "Robust Mobile Route Planning with Limited Connectivity," Proceedings of the 14th Annual Meeting on Algorithm Engineering and Experiments, Jan. 16, 2012, pp. 150-159, XP55072700.

(Continued)

Primary Examiner — Vivek D Koppikar
Assistant Examiner — Navid Ziaeianmehdizadeh
(74) Attorney, Agent, or Firm — Fujitsu Patent Center

(57) ABSTRACT

A computer performs a path search from a departure point to a destination point and a path search from the destination point to the departure point while changing a target from a road type at a level other than the highest level to a road type at a higher level, according to a first grouping of a plurality of road types, and performs a path search for the road type at the highest level in a first process. Next, the computer performs similar path searches in an area to be searched based on a result of the first process, according to a second grouping in which a greater number of road types is classified as the highest level in a second process. Then, the computer generates path information according to a result of the second process.

6 Claims, 28 Drawing Sheets

(56) References Cited

OTHER PUBLICATIONS

Sturtevant, Nathan et al., "Partial Pathfinding Using Map Abstraction and Refinement," Proceedings of the 20th National Conference on Artificial Intelligence, Jul. 9, 2005, pp. 1392-1397, XP55072690.
Extended European Search Report dated Aug. 2, 2013 for corresponding European Application No. 13160713.7.
Dijkstra, E.W., "A Note on Two Problems in Connection with Graphs," Numerische Mathematik 1, pp. 269-271, (1959) <http://www-m3.ma.tum.de/foswiki/pub/MN0506/WebHome/dijkstra.pdf>.
Hart, Peter E. et al., A Formal Basis for the Heuristic Determination of Minimum Cost Path, IEEE Transactions of Systems Science and Cybernetics, vol. SSC-4, No. 2 (Jul. 1968), pp. 100-107.
Iwano, Kazuo, "The Basics of Algorithms" (2010), pp. 86-101.

\* cited by examiner

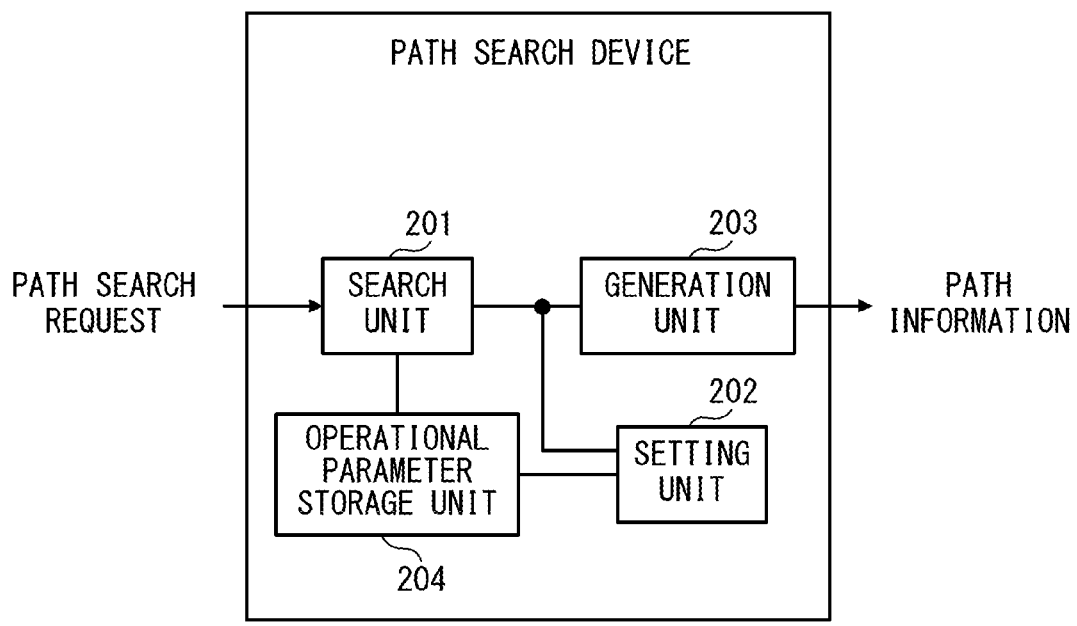
F I G. 2

| RANGE SCALE | SEARCH METHOD |
| --- | --- |
| $D \leqq T1$ | VERY-CLOSE-RANGE SEARCH |
| $T1 < D \leqq T2$ | CLOSE-RANGE SEARCH |
| $T2 < D \leqq T3$ | MEDIUM-RANGE SEARCH |
| $T3 < D$ | LONG-RANGE SEARCH |

FIG. 4A

| | | |
|---|---|---|
| PATTERN A | FIRST LEVEL | NATIONAL ROADS, PRINCIPAL LOCAL ROADS, GENERAL PREFECTURAL ROADS, GENERAL CITY STREETS IN GOVERNMENT-DESIGNATED LARGE CITY, LOCAL STREETS AND ROADS, OTHER ROADS |
| PATTERN B | THIRD LEVEL | EXPRESSWAYS, NATIONAL ROADS, PRINCIPAL LOCAL ROADS |
| | SECOND LEVEL | GENERAL PREFECTURAL ROADS, GENERAL CITY STREETS IN GOVERNMENT-DESIGNATED LARGE CITY |
| | FIRST LEVEL | LOCAL STREETS AND ROADS, OTHER ROADS |
| PATTERN C | FOURTH LEVEL | EXPRESSWAYS, NATIONAL ROADS |
| | FIRST LEVEL | PRINCIPAL LOCAL ROADS |
| | SECOND LEVEL | GENERAL PREFECTURAL ROADS, GENERAL CITY STREETS IN GOVERNMENT-DESIGNATED LARGE CITY |
| | FIRST LEVEL | LOCAL STREETS AND ROADS, OTHER ROADS |
| PATTERN D | FOURTH LEVEL | EXPRESSWAYS |
| | THIRD LEVEL | NATIONAL ROADS, PRINCIPAL LOCAL ROADS |
| | SECOND LEVEL | GENERAL PREFECTURAL ROADS, GENERAL CITY STREETS IN GOVERNMENT-DESIGNATED LARGE CITY |
| | FIRST LEVEL | LOCAL STREETS AND ROADS, OTHER ROADS |

FIG. 4B

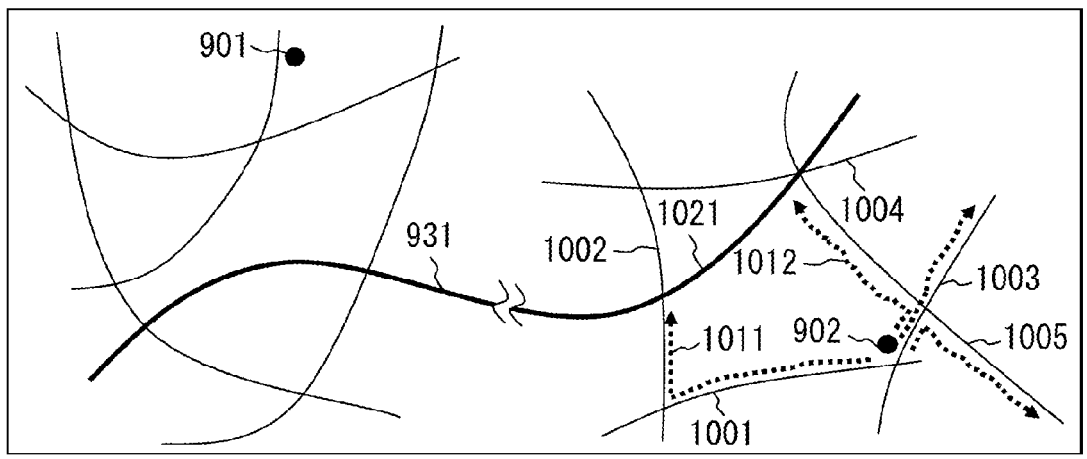
F I G. 10

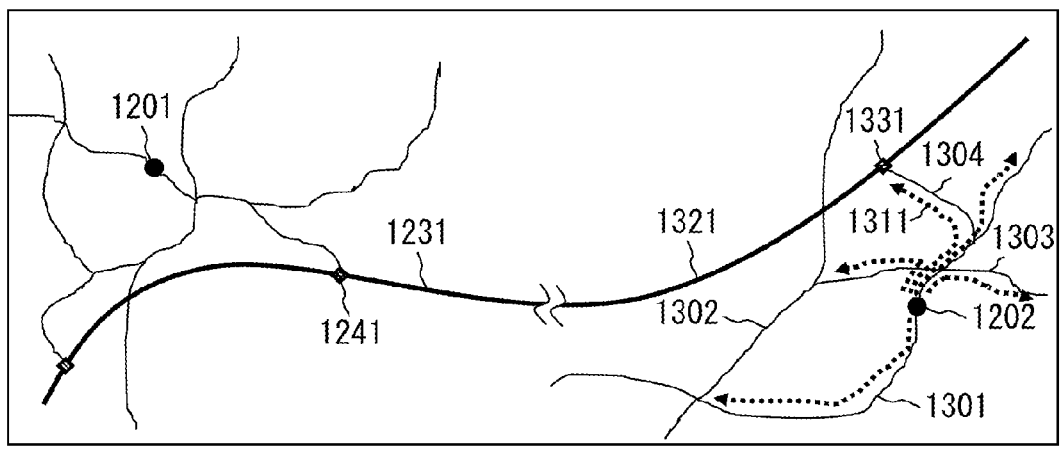
F I G. 1 3

| CANDIDATE PATH | COST VALUE |
|---|---|
| z — y — w | 4 |
| z — y — v — s | 6 |
| z — y — t | 7 |

F I G. 1 6

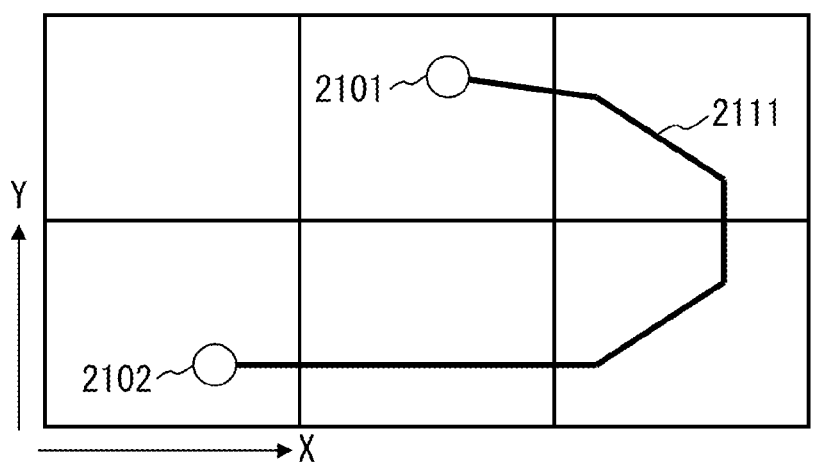
F I G. 19

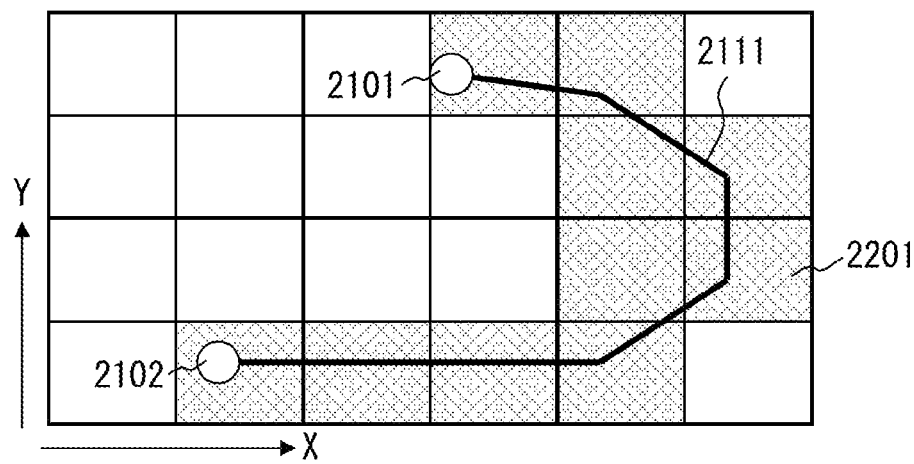
F I G. 2 0

PATH SEARCHING METHOD AND PATH SEARCH DEVICE

CROSS-REFERENCE TO RELATED APPLICATIONS

This application is based upon and claims the benefit of priority of the prior Japanese Patent Application No. 2012-075169, filed on Mar. 28, 2012, the entire contents of which are incorporated herein by reference.

FIELD

The embodiments discussed herein relate to a path searching method, path search device, and a recording medium.

BACKGROUND

A technique of performing a path search is known in which when a path from a departure point to a destination point is searched for by an on-vehicle navigation device according to the map information, map data is divided into rectangular areas along the lines of latitude and longitude and the map data of a specific area is read. In this technique, the area through which the straight line that connects a departure point with a destination point passes is firstly specified and the map data is read, and then some area is specified from a square area that has the straight line as the diagonal line and the map data is read. Accordingly, the map data required for the navigation is efficiently retrieved.

Moreover, a technique is also known in which when a path search is performed according to the map information, roads are classified into one of two or more levels depending on the type of road and one level is selected therefrom. In this technique, a tentative departure point and a tentative destination point on the road network of the selected level are calculated, and a path from the departure point to the destination point is calculated by utilizing in combination the shortest path on the subject road network, a connection path from the departure point to the tentative departure point, and a connection path from the tentative destination point to the destination point. The path-searching period may be shortened by limiting the search target to roads at one level.

As path searching algorithms based on a cost, various kinds of algorithms such as Dijkstra's algorithm and the A* algorithm are known.

In Dijkstra's algorithm, a path with the lowest cost may be efficiently calculated by setting a cost to each edge between nodes and calculating a combination of edges at which the cost is relatively small as a candidate path from a beginning node to an end node.

The A* algorithm is a modified Dijkstra's algorithm for further improved efficiency. In the A* algorithm, a path with the lowest cost is searched for by adding to the cost of Dijkstra's algorithm an estimated value (heuristic value) of the cost of reaching an end node. Accordingly, the area to be searched may be narrowed down to improve the efficiency of processing.

Patent Document 1: Japanese Laid-open Patent Publication No. 2006-162273
Patent Document 2: Japanese Laid-open Patent Publication No. 06-052237
Non-patent Document 1: E. W. Dijkstra, "A Note on Two Problems In Connexion with Graphs", Numerische Mathematik 1, pp. 269-271, 1959.
Non-patent Document 2: P. E. Hart, N. J. Nilsson, B. Raphael, "A Formal Basis for the Heuristic Determination of Minimum Cost Paths", IEEE Transactions of Systems Science and Cybernetics, Vol. SSC-4, No. 2, pp. 100-107, 1968.

SUMMARY

According to an aspect of the embodiments, a path searching method performed by a computer performs, by using a processor, a first path search and a second path search according to a first grouping in which a plurality of road types are classified into a plurality of levels from a lowest level to a highest level.

The first path search is directed from a departure point to a destination point, performed for a road type at a level other than the highest level, and repeated until a node of a road type at the highest level is reached while changing a search target from a road type at a lower level to a road type at a higher level. The second path search is directed from the destination point to the departure point, performed for a road type at a level other than the highest level, and repeated until a node of the road type at the highest level is reached while changing a search target from a road type at a lower level to a road type at a higher level.

Next, the path searching method performs, by using the processor, a third path search for the road type at the highest level according to the node obtained in the first path search and the node obtained in the second path search.

Next, the path searching method sets an area to be searched according to a result of the first path search, the second path search, and the third path search, and performs, by using the processor, a fourth path search and a fifth path search according to a second grouping. A greater number of road types than the road types at the highest level in the first grouping are classified as the highest level in the second grouping.

The fourth path search is directed from the departure point to the destination point, performed for a road type at a level other than the highest level in the area to be searched, and repeated until a node of a road type at the highest level is reached while changing a search target from a road type at a lower level to a road type at a higher level. The fifth path search is directed from the destination point to the departure point, performed for a road type at a level other than the highest level in the area to be searched, and repeated until a node of the road type at the highest level is reached while changing a search target from a road type at a lower level to a road type at a higher level.

Next, the path searching method performs, by using the processor, a sixth path search for the road type at the highest level in the area to be searched according to the node obtained in the fourth path search and the node obtained in the fifth path search. Then, the path searching method generates path information according to a result of the fourth path search, the fifth path search, and the sixth path search.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a functional block diagram illustrating a path search device.
FIG. 4A is a diagram (1) depicting operational parameters.
FIG. 4B is a diagram (2) depicting operational parameters.

FIG. 10 illustrates the second partial path search in a close-range search.

FIG. 13 illustrates the second partial path search in a long-range search.

FIG. 16 depicts partial paths.

FIG. 19 illustrates a rectangular area that is divided into meshes.

FIG. 20 illustrates the first area to be searched.

DESCRIPTION OF EMBODIMENTS

As described above, in the method where the map data used for a path search is specified according to the straight line that connects a departure point with a destination point, the map data required for the navigation is efficiently retrieved. However, the inventors have found that if this method is used, a path search may fail, for example, when a mountain or lake where there is no road exists on the straight line.

Note that such a problem is also present when path searching algorithms other than Dijkstra's algorithm and the A* algorithm are used.

Some embodiments will be described below in detail with reference to the accompanying drawings.

Figure 1:
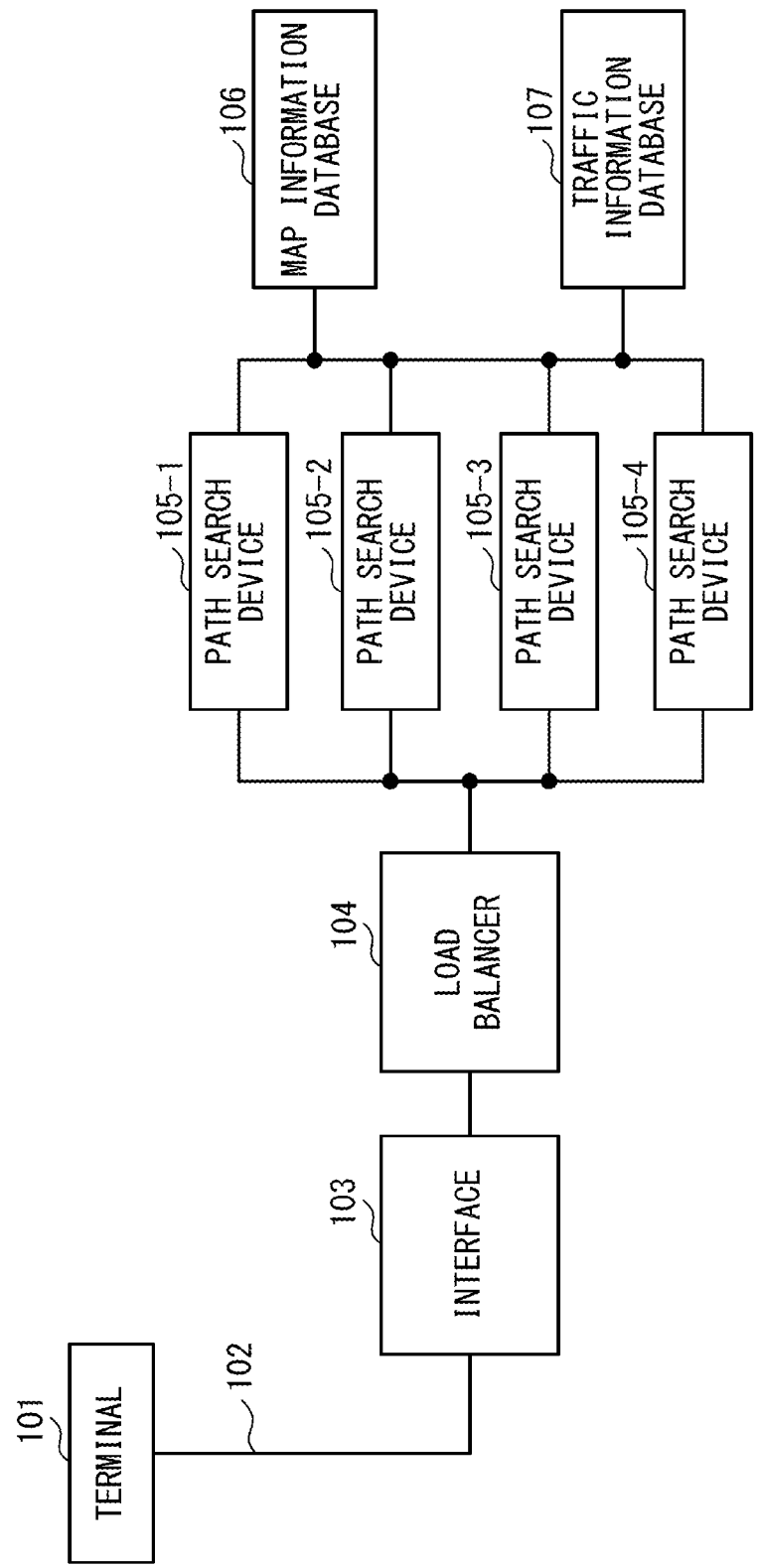
FIG. 1 is a block diagram illustrating a path search system.

FIG. 1 illustrates an example of the configuration of a path search system including two or more path search devices. The path search system of FIG. 1 includes an interface 103, a load balancer 104, path search devices 105-1 to 105-4, a map information database 106, and a traffic information database 107.

The terminal 101 is an information processing apparatus such as a server, a personal computer, or a mobile terminal, which are used by a user, and the terminal 101 accesses the interface 103 via a wired or wireless communication network 102. The terminal 101 transmits to the interface 103 a path search request that includes the information about a departure point and a destination point.

The interface 103 is an information processing apparatus that receives a path search request, and the interface 103 transfers the received path search request to the load balancer 104. The load balancer 104 is an information processing apparatus that distributes two or more path search requests, and the load balancer 104 transmits the path search request transferred from the interface 103 to one of the path search devices 105-1 to 105-4 according to a specified load balancing algorithm.

The map information database 106 stores the map information including the road information of two or more roads. The road information of the roads includes the positional information of two or more nodes included in the roads and the information about road links that correspond to links among nodes.

Anode indicates a breakpoint at which a road is split including a point like an intersection at which a road branches. Segments of one road delimited by nodes are road links. In the cases where one road on the map is divided into opposed segments such as an up line and a down line, links that are independent from each other and for which the direction is defined may be set for consideration. Alternatively, links for which the direction is not defined may be set on one road for consideration. The road information of the roads includes the information indicating the type of road. Hereinafter, a road link may be referred to simply as a link. The terms "vertex" and "edge" are used in graph theory in mathematics, but they will be expressed as "node" and "link" in the following description.

The traffic information database 107 stores traffic information including the cost of each link. As the cost of each link, for example, the distance between both ends of a link (i.e., the length of a link), the period of time required to travel between both ends of a link along the link, or a cost in which the length of link is combined with the period of time required for travel is used. Even if the lengths of links are the same, the period of time required for the movement may vary depending on conditions such as the type of the road to which the link belongs, the positions of the links, the date and time of the movement on the links, or the like.

Each of the path search devices 105-1 to 105-4 is an information processing apparatus that performs a path searching process, and obtains a path from a departure node to a destination node according to the received path search request, the map information in the map information database 106, and the map information in the traffic information database 107. Then, each of the path search devices 105-1 to 105-4 generates path information that indicates the obtained path, and transmits the generated path information to the load balancer 104. The path information is transmitted to the terminal 101 through the interface 103 and the communication network 102.

The terminal 101 transmits to another information processing apparatus the information used to display the path that is indicated by the received path information, or displays the path on a screen.

FIG. 2 illustrates an example of the functional configuration of the path search devices 105-1 to 105-4 of FIG. 1. The path search devices 105-1 to 105-4 have a similar functional configuration in common, and each of the path search devices 105-1 to 105-4 is referred to as the path search device 105. The path search device 105 of FIG. 2 includes a search unit 201, a setting unit 202, a generation unit 203, and an operational parameter storage unit 204.

The operational parameter storage unit 204 stores operational parameters that are referred to by the search unit 201 and the setting unit 202. The operational parameters include the information on two or more range scales, the information on the grouping of roads according to each range scale, and the information on an area to be searched. The grouping of road types indicates the relationship between each road type and one level from two or more levels.

The path search system of FIG. 1 includes one terminal 101, but two or more terminals may be included in a path search system according to the present embodiment. Moreover, the path search system of FIG. 1 includes four path search devices 105-1-105-4, but the number of the path search devices included in a path search system according to the present embodiment may be equal to or less than three, or may be equal to or greater than five. In actuality, the number of path search devices is determined according to the load on the system. In cloud computing, the number of path search devices may be increased or decreased in a flexible manner.

Instead of implementing the path search devices as independent information processing apparatuses, the path search devices may be implemented as virtual machines that operate in the same information processing apparatus or in a different information processing apparatuses. Two or more path search requests may be processed by batch processing instead of being processed in real time in an independent manner.

The inventors considered utilizing algorithms such as Dijkstra's algorithm and the A* algorithm when developing a path search system. The inventors have found that if Dijkstra's algorithm or the A* algorithm is implemented on a system, the number of nodes or links to be searched for increases as the area in which a path is to be searched for becomes broader, and that the processing time becomes longer as a result. To address this problem, the inventors have found that it is preferable to introduce two ideas in order to reach a solution in a realistic processing time.

The first idea corresponds to a technique disclosed in the conventional technique. In other words, upon the classification of the roads into two or more levels according to the type of road, firstly, a path from a departure point to a tentative departure point on a higher-level road network is searched for by using the lowest-level road network, which is gradually changed to a higher-level road network. In a similar manner, a path from a destination point to a tentative destination point on an even higher-level road network is searched for while changing the road network to a higher-level road network. Then, a path that connects the departure point with the destination point via the tentative departure point and the tentative destination point is searched for on the road network composed of the road network that establishes a connection between the above departure point and the tentative departure point, the road network that establishes a connection between the tentative destination point and the destination point, and the above higher-level road network.

The number of nodes or links included in a higher-level road network is generally smaller than the number of nodes or links included in the entire road network including a lower-level road network. Accordingly, if this technique is used, roads at a higher level are targeted for search, and it becomes possible to prevent the processing time from being long. Moreover, a path determined in such a manner as above is similar to a path that is actually taken by a person when he/she travels by car.

The second idea corresponds to a technique disclosed in the conventional technique. That is, when a search is performed in such a manner as above, two or more administrative road types are considered to be at the same level.

In consideration of the ideas discussed above, the inventors have further realized that it is preferable to introduce an additional mechanism in order to reach a solution in a realistic processing time. Firstly, an idea is to be considered in which when the road types are classified into two or more levels, the way of classification is changed according to the range scale to be searched. Here, it is not necessary to classify roads into two or more levels in accordance with the administrative road types, and as a matter of course, each road may be associated with any level in an independent manner.

As an alternative, an idea is to be considered in which the range scale to be searched is divided into a few stages and the way of searching is varied for every range scale.

Figure 3:
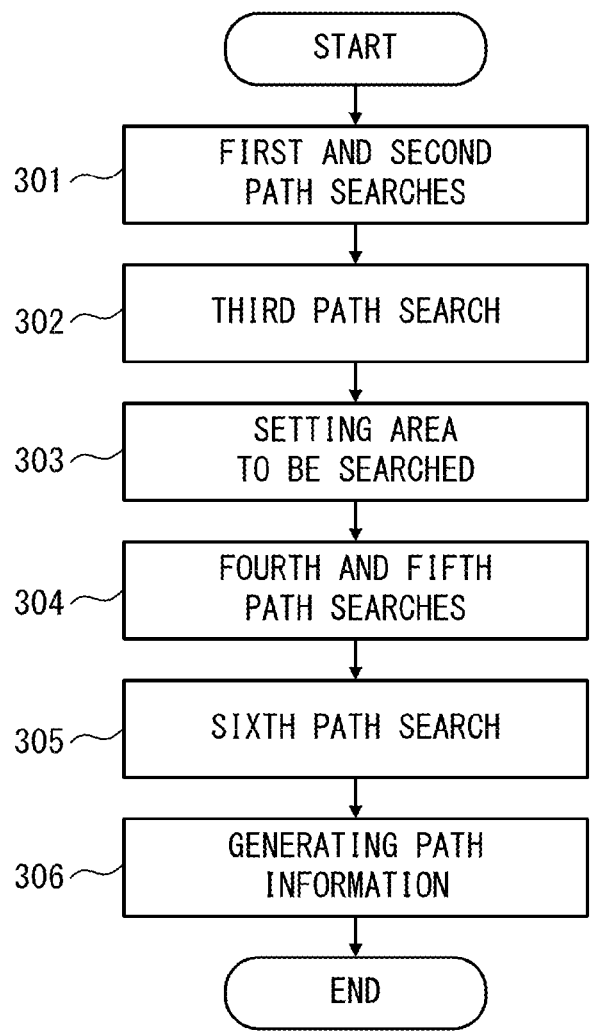
FIG. 3 is a flowchart of a path searching process.

FIG. 3 is a flowchart illustrating an example of the path searching process performed as the processing units in the path search device 105 of FIG. 2 co-operate. In the process of searching for a path according to the present embodiment, it is needless to say that the two points are not necessarily the points from which a user of the terminal 101 actually departs or at which a user of the terminal 101 actually arrives as long as a path is searched for between the two points. In the following description, the term departure point or departure node, and the term destination point or destination node will be used. These terms are an example of the first node at which the search process starts and an example of the second node at which the search process terminates, respectively.

Firstly, the search unit 201 performs the first path search and the second path search according to the first grouping included in the operational parameters (step 301). In the first grouping, two or more road types are classified into two or more levels from the lowest level to the highest level. The first path search is a part of the path search directed from a departure node to a destination node included in the path search request (i.e., a part of the entire path search) performed for road types at a level other than the highest level, and is repeated until a node of the road types at the highest level is reached while changing a search target from a road type at a lower level to a road type at a higher level. The second path search is a part of the path search directed from a destination node to a departure node (i.e., a part of the entire path search) performed for road types at a level other than the highest level, and is repeated until a node of the road types at the highest level is reached while changing a search target from a road type at a lower level to a road type at a higher level.

Next, the search unit 201 performs the third path search for the road types at the highest level (step 302). In the third path search, a path is searched that establishes a connection between the departure node and the destination node through one or more points obtained in the first path search (i.e., nodes as intermediate arrival points in the path search) and one or more points obtained in the second path search (i.e., nodes as intermediate arrival points in the path search).

Next, the setting unit 202 sets an area to be searched according to a result of the first path search, the second path search, and the third path search, and stores the area to be searched information in the operational parameter storage unit 204 (step 303).

Next, the search unit 201 performs the fourth path search and fifth path search according to the second grouping included in the operational parameters (step 304). A greater number of road types than the road types at the highest level in the first grouping are classified as the highest level in the second grouping. The fourth path search is a part of the path search directed from a departure node to a destination node (i.e., a part of the entire path search) performed for road types at a level other than the highest level in the area to be searched set by the setting unit 202, and is repeated until a node of the road types at the highest level is reached while changing a search target from a road type at a lower level to a road type at a higher level. The fifth path search is a part of the path search directed from a destination node to a departure node (i.e., a part of the entire path search) performed for road types at a level other than the highest level in the area to be searched, and is repeated until a node of the road types at the highest level is reached while changing a search target from a road type at a lower level to a road type at a higher level.

Next, the search unit 201 performs the sixth path search for the road types at the highest level in the area to be searched (step 305). In the sixth path search, a path is searched that establishes a connection between the departure node and the destination node via one or more points obtained in the fourth path search (i.e., nodes as intermediate arrival points in the path search) and one or more points obtained in the fifth path search (i.e., nodes as intermediate arrival points in the path search).

Next, the generation unit 203 generates path information according to the results of the fourth path search, the fifth path search, and the sixth path search (step 306). The generated path information includes node information and road link information that indicate the path from the departure node to the destination node.

It is to be noted that the level of road types to be searched in each of the first to sixth path searches is not necessarily limited to one level. For example, as the road types at the "highest level", the road types associated with two or more levels including the highest level may be assumed to be at the highest level. Moreover, the level of road types to be searched is not necessarily the same between the first and second path searches, or the level of road types to be searched is not necessarily the same between the fourth and fifth path searches.

According to such a path search system, an area to be searched may be set around a path obtained in the first path search, the second path search, and the third path search. Accordingly, a path search based on another grouping where an area in which roads are likely to exist is set as an area to be searched may be performed in the fourth path search, the fifth path search, and the sixth path search.

When road types that correspond to an enormous number of roads are classified as the highest level in the grouping of road types, a path search may be performed at low speed for the road types at the highest level. Given these circumstances, in the first grouping, the number of the road types associated with the highest level may be fewer such that the third path search will be performed at high speed and it will become possible to obtain a tentative path at high speed. Then, a more detailed sixth path search limited to an area to be searched that includes the tentative path may be performed by increasing the number of the road types associated with the highest level in the second grouping than that of the first grouping. Due to such a two-stage path searching process, it becomes possible to obtain an accurate path from the departure point and the destination point at high speed.

FIGS. 4A and 4B illustrate an example of the operational parameters stored in the operational parameter storage unit 204 of FIG. 2. In the example of FIG. 4A, the four search methods, the very-close-range search, the close-range search, the medium-range search, and the long-range search, are defined according to the range scale to which the distance D between a departure point and a destination point belongs.

In the example of FIG. 4B, the association between the type of road and each level is defined in two or more patterns. In FIG. 4B, expressways, national roads, principal local roads, general prefectural roads, general city streets in a government-designated large city, local streets and roads, and other roads, which are based on the provisions of the Road Act or the like, are depicted. Expressways include not only national expressways but also urban expressways. National roads correspond to, for example, general national roads, i.e., the national roads that are not expressways but general roads. The categories used in the country in which a path search is to be performed may be used as the road types. The information about the type of road associated with each road, which is stored in the map information database 106, is one of these road types. The range scales that correspond to the respective search methods are as follows.

(1) Very-close-range search: the first range scale in which the distance D is equal to or less than the threshold T1

(2) Close-range search: the second range scale in which the distance D is greater than the threshold T1 and is equal to or less than the threshold T2

(3) Medium-range search: the third range scale in which the distance D is greater than the threshold T2 and is equal to or less than the threshold T3

(4) Long-range search: the fourth range scale in which the distance D is greater than the threshold T3

Moreover, the following way of classification may be adopted as the grouping of roads.

(1) Pattern A

First level: national roads, principal local roads, general prefectural roads, general city streets in a government-designated large city, local streets and roads, and other roads (2) Pattern B Third level: expressways, national roads, and principal local roads Second level: general prefectural roads, and general city streets in a government-designated large city First level: local streets and roads, and other roads (3) Pattern C Fourth level: expressways and national roads Third level: principal local roads Second level: general prefectural roads, and general city streets in a government-designated large city First level: local streets and roads, and other roads (4) Pattern D Fourth level: expressways Third level: national roads, and principal local roads Second level: general prefectural roads, and general city streets in a government-designated large city First level: local streets and roads, and other roads Then, as the association between the range scale and the grouping pattern, for example, pattern A, pattern B, patterns C and B, and pattern D may be associated with the very-close-range search, the close-range search, the medium-range search, and the long-range search, respectively. When a search process is performed according to the distance between a departure point and a destination point, for example, the search may be divided into several phases and then be performed. Further, the pattern to be used may be varied according to the phase.

When there are two or more levels in a pattern, a level with a greater numeric value may be expressed as a greater level in the present embodiment. For example, the highest level in the pattern C is the fourth level, and the highest level in the pattern B is the third level.

In FIG. 4A, threshold T1, threshold T2, and threshold T3 correspond to values from, for example, the range between 500 m to 1500 m, the range between 3000 m to 10 km, and the range between 30 km to 100 km, respectively. In the example of FIG. 4A, the range scale is divided into four, but the range scale may be divided into three or less, or five or more. Moreover, the number of levels in each group depicted in FIG. 4B may be smaller or greater than the number of levels in FIG. 4B. The thresholds of the range scale and the road types in each level of grouping are set as operational parameters.

The following search techniques may be applied to the search methods above.

(1) Very-Close-Range Search

The roads of all road types excluding expressways are classified into the same level (first level), i.e., for all the roads, a path search is performed from a departure node to a destination node by using Dijkstra's algorithm, the A* algorithm, or the like. When the departure point or destination point is included in an expressway, however, the expressway is added to the first level and then a path search is performed.

(2) Close-Range Search

Firstly, as the first path search, a search is performed on a road level hierarchy from a departure node to a destination node for a higher level, and the search reaches a certain road level. For the explanation, this certain road level is referred to as Λ (lambda). A lower road level than Λ is to be searched in the first path searching process, but after a node x1 at a higher level is reached in the road level lower than Λ, links at that higher level are to be searched for from the node x1 in the following search process.

In the first path searching process, one or more candidate partial paths are obtained, and the obtained group of candidate partial paths is referred to as P1. Moreover, the road network composed of the set of the road links that constitute the candidate partial paths of P1 over the entirety of P1 is referred to as U1. Further, the group of nodes at which P1 is connected to roads at the level Λ is referred to as N1.

Next, as the second path search, a search is performed on a road level hierarchy from the destination node to the departure node for a higher level, and the search reaches the level Λ. In a similar manner to the first path search, a lower road level than Λ is to be searched also in the second path searching process, but after a node x2 at a higher level is reached in the road level lower than Λ, links at that higher level are to be searched for from the node x2 in the following search process.

One or more candidate partial paths are obtained in the second path searching process, and this group of candidate partial paths is referred to as P3. Moreover, the road network composed of the set of the road links that constitute the candidate partial paths of P3 over the entirety of P3 is referred to as U3. Further, the group of nodes at which P3 is connected to roads at the level Λ is referred to as N3.

Next, as the third path search, it is determined that the network composed of "roads at the level equal to or higher than the level Λ, which are connected to N1 and N3" is "U2", and that the entire network composed of U1, U2, and U3 is "U", a path "p" connecting between the departure node and the destination node through a group of links on "U" is obtained.

In each of the first path search, the second path search, and the third path search, Dijkstra's algorithm, the A* algorithm, or the like may be used. Moreover, in each of the path searches, two or more levels of roads may be searched.

(3) Medium-Range Search

A path search may be divided into two or more phases and then be performed. In other words, a path search may be divided into two phases and then be performed, where the two phases include the first path search in which an outline path from a departure node to a destination node is calculated and the second path search in which a detailed path within an area to be searched that is limited according to the result of the first path search is calculated.

Firstly, in first path search, the road types that are associated with a higher level (typically, the highest level) are limited to a few types such as only expressways and national roads in the pattern C.

Next, in the second path search, an area including the path obtained in the first path search is set. An area to be set includes, for example, "a set of one or more spatially continuous (i.e., contacting or having a portion in common) rectangular areas that cover the path obtained in the first path search", "a set of one or more spatially continuous rectangular areas that cover a line segment connecting between a departure point and a destination point", or "the sum of these sets of rectangular areas", or further, "the sum of the above sum and a set of rectangular areas that cover 'a portion that is not covered by the sum of the sets of rectangular areas but is surrounded by the sum of the sets of rectangular areas' produced when the sum of the sets of rectangular areas is spatially expanded" may be used.

Then, a path search is performed in the set area. In the second path search, the number of the road types that are associated with a higher level (typically, the highest level) is increased compared to the first path search. For example, the pattern B may be used. Then, a path obtained as a result of the second path search is adopted as the search result of the whole medium distance path search.

(4) Long-Range Search

Firstly, a group of candidate entrances E to expressways close to the departure node is calculated. As the group of candidate entrances E, entrances may be chosen from, for example, "entrances that are closest to the departure node" or "entrances whose values of 'the straight-line distance between the departure node and one entrance+the straight-line distance between the one entrance and the destination node' are the smallest among the entrances that are closest to the departure node".

Then, the above-described very-close-range search or close-range search is performed from the departure node to "E". As a result, a group of candidate partial paths is obtained as a part of the entire long-range search. For the explanation, such a group of candidate partial paths will be referred to as "R1". Moreover, a road network composed of the set of road links over the entire R1, which are included in the candidate partial paths of R1, is referred to as "W1". The group of nodes at which R1 connects to expressways is "E".

Next, a group of candidate exits S from expressways close to the destination node is calculated. As the group of candidate exits S, exits may be chosen from, for example, "exits that are closest to the destination node" or "exits whose values of 'the straight-line distance between the departure node and one exit+the straight-line distance between the one exit and the destination point' are the smallest among the exits that are closest to the destination node".

Then, the above-described very-close-range search or close-range search is performed from the destination node to "S". As a result, a group of candidate partial paths is obtained as a part of the entire long-range search. For the explanation, such a group of candidate partial paths will be referred to as "R3". Moreover, a road network composed of the set of road links over the entire R3, which are included in the candidate partial paths of R3, is referred to as "W3". The group of nodes at which R3 connects to expressways is "S".

Next, the network composed of the "expressways that connect to 'E' or 'S'" is referred to as "W2", and the entire network composed of W1, W2, and W3 is referred to as "W". Then, Dijkstra's algorithm, the A* algorithm, or the like is used to calculate a path "r" that establishes a connection between the departure node and the destination node through the group of links on "W". A result of this calculation is adopted as a search result of the entire long-range search.

The above-described path searching methods by distance will be expressed in an alternative way. In each of the close-range search, medium-range search, and long-range search, firstly, the path search is performed for the road at the lowest level that is connected to the departure point. Then, once a road at a higher level is reached in the path search being performed for the roads at lower levels, the process of switching the path search to a path search to be performed for the roads at a higher level is repeated. Accordingly, a partial path on the departure point side may be obtained as a partial path that establishes a connection between the departure node and a road at the highest level. In a similar manner, a partial path on the destination point side may be obtained as a partial path that establishes a connection between the destination node and a road at the highest level. Further, an intermediate partial path may be obtained as a path that passes through a road at the highest level and exists between a partial path on the departure point side and a partial path on the destination point side to connect the partial paths on both sides. Finally, the entire path whose starting point is the departure point and that connects a partial path on the departure point side, a partial path on the destination point side, and an intermediate partial path to establish a connection between the departure point and the destination point is obtained.

Note that a partial path on the destination point side is calculated in advance as an independent step before an intermediate partial path is obtained because an entrance to the partial path on the destination point side is not found if a path is calculated in the order of the partial path on the departure point side, an intermediate partial path, and the partial path on the destination point side. In other words, it is hard to decide when to start calculating the partial path on the destination point side if the timing is dependent on the calculation progress of the intermediate partial path.

Note that there may be cases in which a node on a road at a higher level by two or more levels is searched for when a path search is being performed for a road type at a lower level. For example, once a node on a road at the third level is searched for while a path search is being performed for a road type at the first level, a node on a road at the third level may be searched for in the following search processes.

A road at which a departure node or a destination node is placed is not necessarily limited to a road at the first level, but may belong to the road type at the second level or higher.

Figure 5:
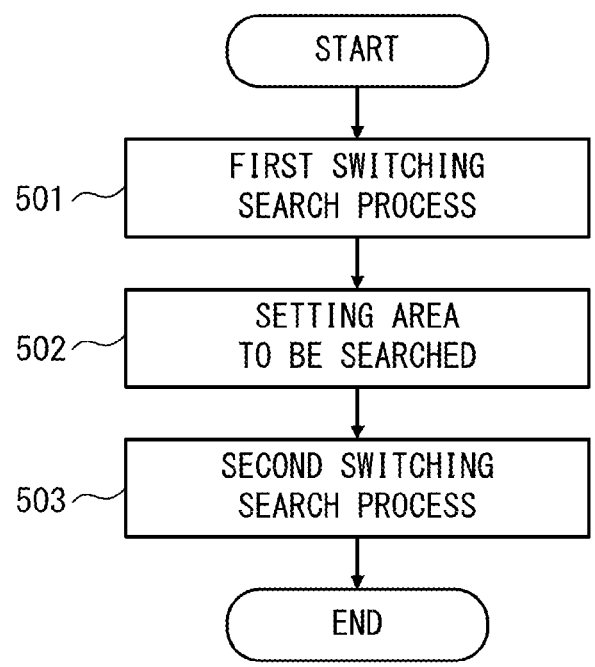
FIG. 5 is a flowchart illustrating a two-stage path searching process.

FIG. 5 is a flowchart of an example of the two-stage path searching process when, for example, a medium-range search is performed in steps 301 to 305 of FIG. 3. The two-stage path searching process includes the first and second switching search processes, and in the second switching search process, a path search is performed in which the pattern B in FIG. 4B is used as the second grouping. On the other hand, in the first switching search process, a path search is performed in which the pattern C, where only some of the road types at the highest level in the pattern B depicted in FIG. 4B are associated with the highest level, is used as the first grouping. The information indicating which pattern of the group of road types is to be used in each switching search process is stored in the operational parameter storage unit 204 as an operational parameter.

Firstly, the search unit 201 performs the first switching search process according to the first grouping included in an operational parameter (step 501). Note that the first switching search process corresponds to steps 301 and 302 in FIG. 3. Next, the setting unit 202 sets an area to be searched according to a result of the first switching search process, and stores the area to be searched information in the operational parameter storage unit 204 (step 502). The process in step 502 corresponds to step 303 in FIG. 3.

Then, the search unit 201 performs the second switching search process for the set area to be searched according to the second grouping included in the operational parameters (step 503). The second switching search process corresponds to steps 304 and 305 in FIG. 3.

When the search method is, for example, the medium-range search, since there are many national roads and principal local roads in Kanto region, there is a possibility that a path is not obtained in real time if a path search based on the pattern B in FIG. 4B, i.e., the second grouping, is performed from the beginning.

Hence, in the first switching search process, a tentative path may be obtained at high speed by using a pattern in which the number of the road types at the highest level is fewer than that of a pattern used in the second switching search process. For example, when the pattern C in which the road types at the highest level are limited to expressways and national roads is used, the efficiency of a path search is improved compared with when the pattern B is used.

Figure 6:
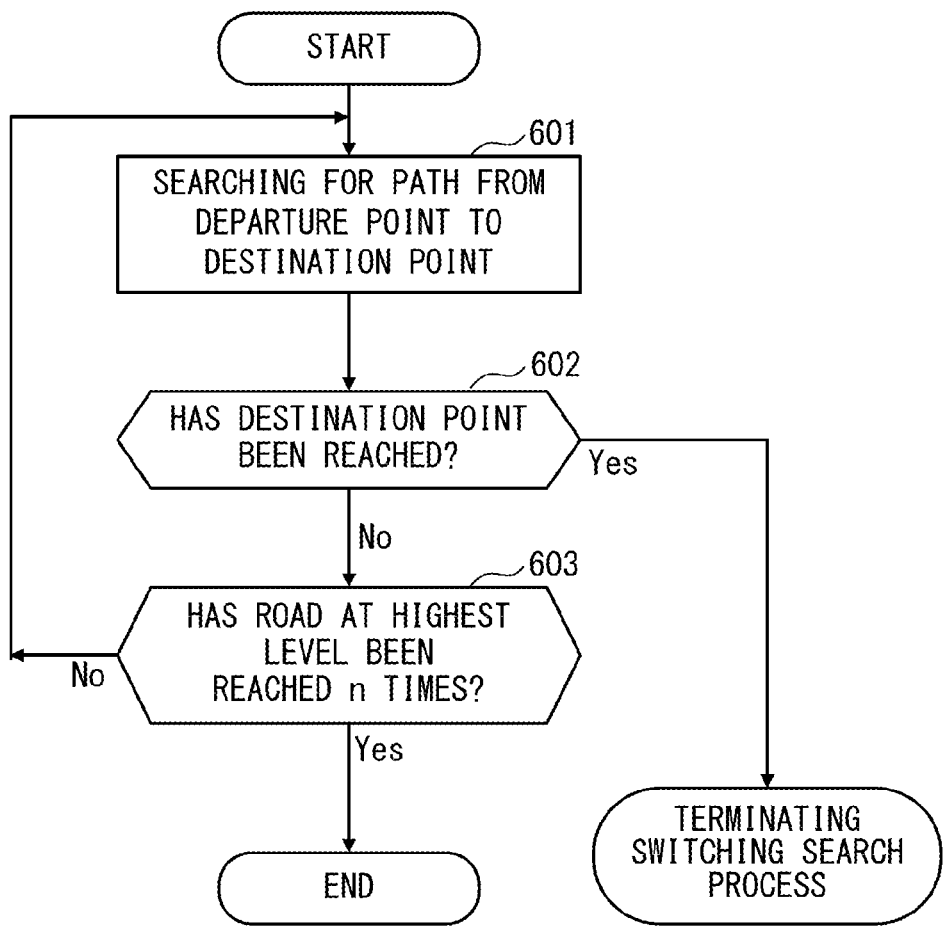
FIG. 6 is a flowchart of the first partial path searching process.
Figure 7:
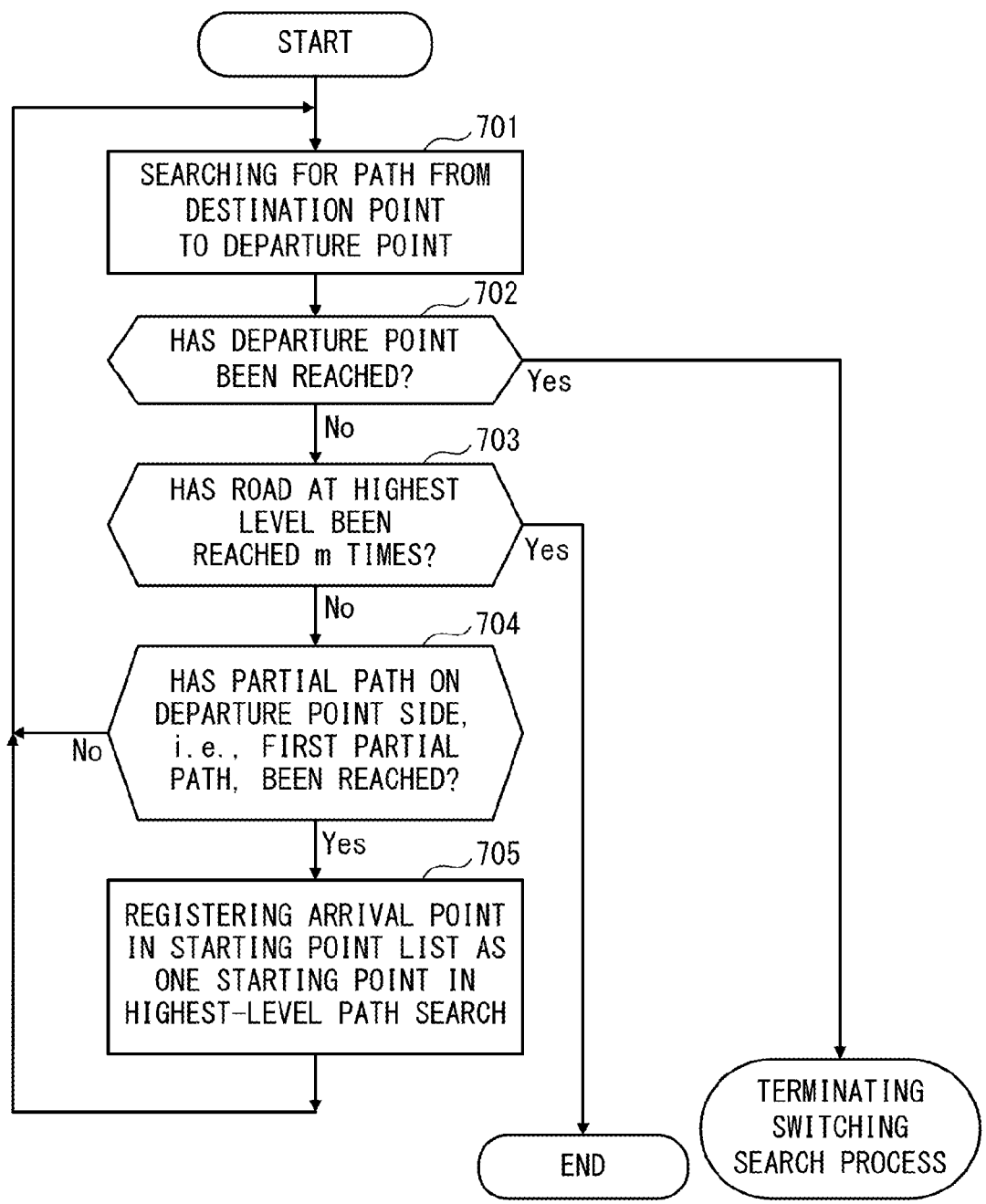
FIG. 7 is a flowchart of the second partial path searching process.
Figure 8:
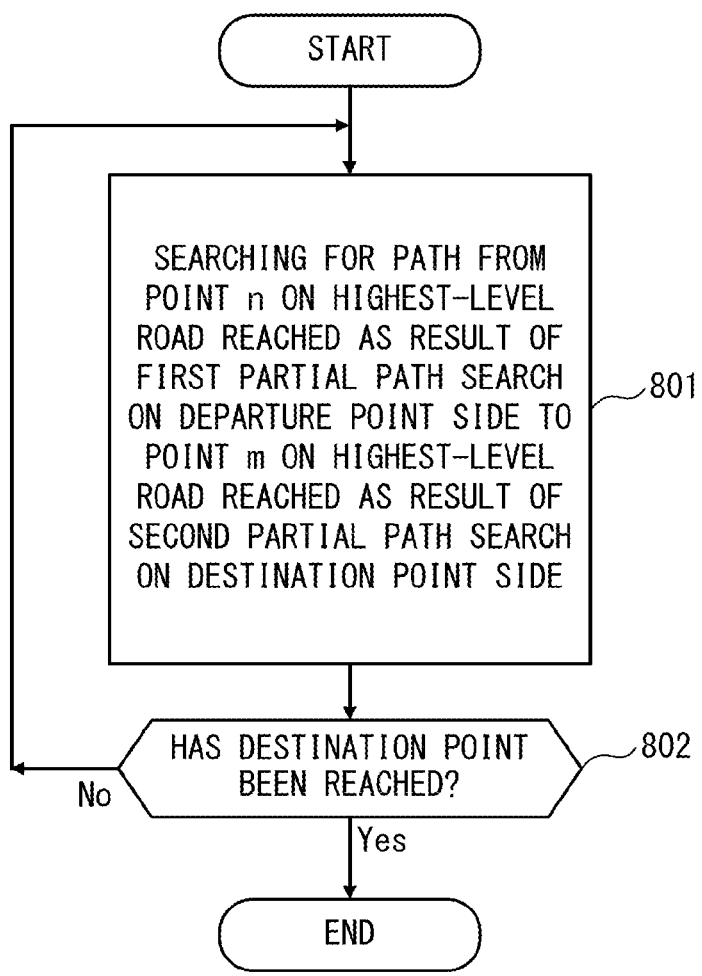
FIG. 8 is a flowchart of a path searching process at the highest level.

FIGS. 6 through 8 are flowcharts of an example of the switching search process in steps 501 or 503 of FIG. 5. FIG. 6 is a flowchart of the first partial path searching process in which a partial path is obtained that establishes a connection between the departure point and a road at the highest level, which corresponds to the first path search in step 301 or the fourth path search in step 304 of FIG. 3. FIG. 7 is a flowchart of the second partial path searching process in which a partial path is obtained that establishes a connection between the destination point and a road at the highest level, which corresponds to the second path search in step 301 or the fifth path search in step 304 of FIG. 3. FIG. 8 is a flowchart of the highest level path searching process for a road at the highest level, which corresponds to the third path search in step 302 or the sixth path search in step 305 of FIG. 3.

The number of partial paths n ("n" is an integer equal to or greater than 1) calculated in the first partial path searching process and the number of partial paths m ("m" is an integer equal to or greater than 1) calculated in the second partial path searching process are set as operational parameters. As the path searching algorithm, for example, Dijkstra's algorithm or the A* algorithm is used, and the information of nodes that become passing-through node candidates (i.e., nodes through which answer path candidates pass) is stored in an open list while the search is in progress. Here, the term "open list" refers to the data table in which the information of the nodes and road links that compose a candidate path and cost values of these candidate paths are associated with each other and stored.

In the first partial path searching process, firstly, the search unit 201 refers to the grouping of roads given as operational parameter values to search for a partial path that establishes a connection between the departure point and a road at the highest level (step 601 in FIG. 6). In the search for a partial path, roads at the lowest level to the second highest level are targeted from the two or more roads included in the map information. Once a road at a higher level is reached in the partial path search, the process of switching the search so as to perform a search for the roads at the reached level is repeated. In step 601, the process of following one road link between a pair of adjacent nodes along the targeted road is performed as a step of such a search.

Next, the search unit 201 checks whether or not the destination point has been reached by tracking the road links (step 602). When the destination point has been reached (step 602, "Yes"), the switching search process is terminated because a path from the departure node to the destination node is found.

When the destination point has not yet been reached (step 602, "No"), the search unit 202 checks whether or not the number of times a road at the highest level has been reached thus far in the processing is "n" (step 603). When the number of times a road at the highest level has been reached is less than "n" (step 603, "No"), the processes of step 601 and the following steps are repeated. When the number of times a road at the highest level has been reached is "n" (step 603, "Yes"), the first partial path searching process is terminated. Accordingly, n partial paths as well as n nodes that are endpoints of each partial path and are arrival points on a road at the highest level (n.b., these arrival points correspond to intermediate arrival points in the entire path search) are obtained. These nodes are endpoints of the links on one of the roads at the highest level.

In the second partial path searching process, firstly, the search unit 201 refers to the grouping of roads given as operational parameter values to search for a partial path that establishes a connection between the destination point and a road at the highest level (step 701 in FIG. 7). In the search for a partial path, roads at the lowest level to the second highest level are targeted from the two or more roads included in the map information. Once a road at a higher level is reached in the partial path search, the process of switching the search so as to perform a search for the roads at the reached level is repeated. In step 701, the process of following one road link between a pair of adjacent nodes along the targeted road is performed as a step of such a search.

Next, the search unit 201 checks whether or not the departure point has been reached by tracking the road links (step 702). When the departure point has been reached (step 702, "Yes"), the switching search process is terminated because a path from the departure node to the destination node is found.

When the departure point has not yet been reached (step 702, "No"), the search unit 202 checks whether or not the number of times a road at the highest level has been reached thus far in the processing is "m" (step 703). When the number of times a road at the highest level has been reached is less than "m" (step 703, "No"), the search unit 202 checks whether or not one of the n nodes obtained thus far in the first partial path searching process has been reached (step 704). When none of the n nodes has been reached yet (step 704, "No"), the processes of step 701 and the following steps are repeated. When any of the nodes on one of the n partial paths has been reached (step 704, "Yes"), the node of the arrival point is registered in a starting point list as one starting point in a path search at the highest level (step 705), and then the processes of step 701 and the following steps are repeated.

When the number of times a road at the highest level has been reached is m in step 703 (step 703, "Yes"), the second partial path searching process is terminated. Accordingly, m partial paths as well as m nodes that are endpoints of each partial path and are arrival points on a road at the highest level are obtained.

In the path searching process with particular emphasis on the highest level, firstly, the search unit 201 refers to the grouping of roads, which is given as operational parameter values, from the operational parameters, to search a path with particular emphasis on the roads at the highest level among two or more roads included in the map information (step 801 in FIG. 8).

In this path search, a path from the departure point to the destination point is searched for from the links included in a road network that includes the paths, which are obtained in the first partial path searching process, from the departure point to each of the n nodes, the links included in a road network that includes the paths, which are obtained in the second partial path searching process, from the destination point to each of the m nodes, and the links included in a road network at the highest level to which n nodes and m nodes are connected. Here, the paths obtained in the first partial path searching process may be used as paths from the departure point to the n nodes.

In step 801, the process of following one road link between a pair of adjacent nodes along the targeted road is performed as a step of such a search.

Next, the search unit 201 checks whether or not a node connected to the destination point has been reached by tracking the road links (step 802). When the node connected to the destination point has not yet been reached (step 802, "No"), the search unit 202 repeats the processes of step 801 and the following steps. When the node connected to the destination point has been reached (step 802, "Yes"), the path searching process with particular emphasis on the highest level is terminated because a path from the departure node to the destination node is found.

In the path searching process with particular emphasis on the highest level, a path search between n nodes obtained in the first partial path searching process and m nodes obtained in the second partial path searching process may be performed on an individual basis. However, it is preferred for efficient processing that the partial paths obtained in the first partial path search be considered to be the searched-for candidate paths, and that a path from the departure node to the destination node be obtained in one path search.

Figure 9:
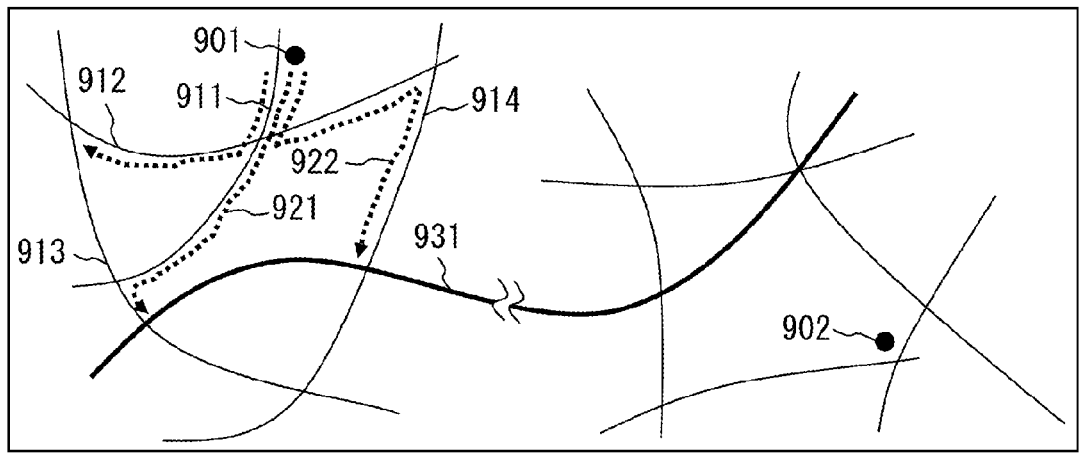
FIG. 9 illustrates the first partial path search in a close-range search.

For example, in the case of the close-range search as illustrated in FIG. 9, a path is searched for from roads 911 to 914 at the first level indicated by a thin line in FIG. 9 in the first partial path searching process, and paths 921 and 922 indicated by a dotted lines in FIG. 9 are obtained as partial paths that establish a connection between the departure point 901 to a road 931 at the second level indicated by a bold line in FIG. 9.

It is to be noted that the roads 911 to 914 are not determined to be searched for in advance before a search starts in an area to be searched. As a path is searched for from the departure point 901 to the destination point 902, the roads 911 to 914 are consequently searched. The partial paths 921 and 922 in the first partial path search start from the departure point. Similar considerations apply to the second partial path searching process.

In the second partial path searching process, as illustrated in FIG. 10, a path is searched for from roads 1001 to 1005 at the first level indicated by a thin line in FIG. 10, and partial paths 1011 and 1012 indicated by a dotted line in FIG. 10 are obtained as partial paths that establish connections between the destination point 902 and a road 1021 at the second level indicated by a bold line in FIG. 10.

Figure 11:
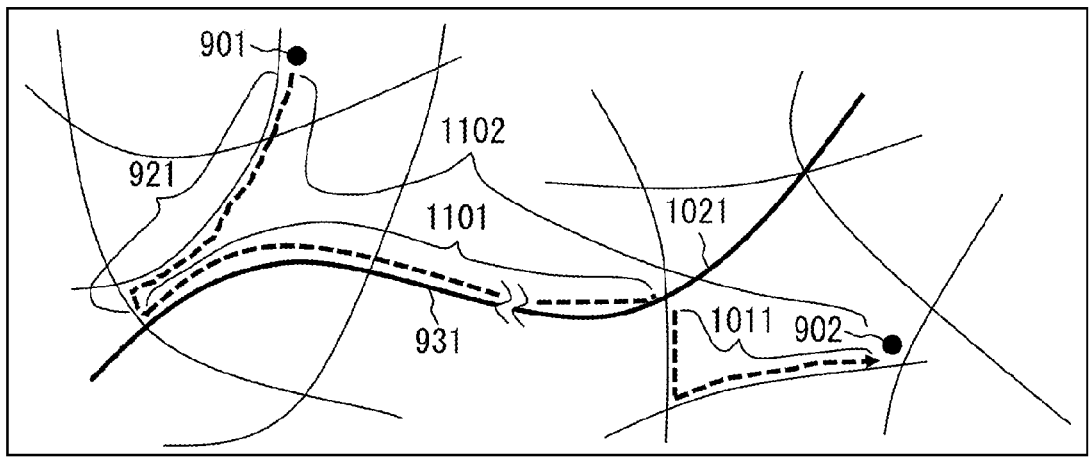
FIG. 11 illustrates a path search at the highest level in a close-range search.

In the highest level path searching process, as illustrated in FIG. 11, a path 1102 indicated by a dotted line in FIG. 11 is obtained as a path from the departure point 901 to the destination point 902 passing through the partial path 921, the roads 931 and 1121 (1101) at the second level, and the partial path 1011.

In the medium-range search, the level of the roads 911 to 914 of FIG. 9 and the roads 1001 to 1005 of FIG. 10 is the second level or the first level.

Figure 12:
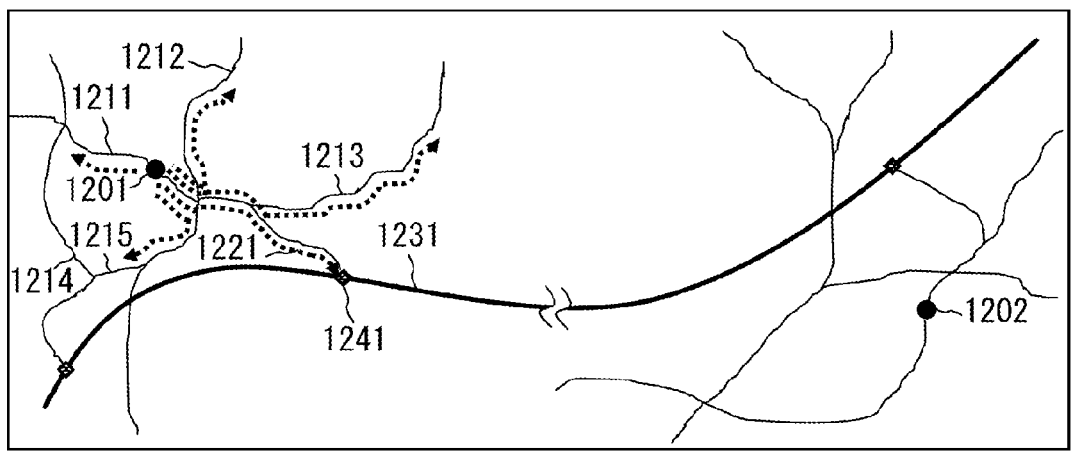
FIG. 12 is a diagram illustrating the first partial path search in a long-range search.

In the long-range search, as illustrated in FIG. 12 for example, a path is searched for from the roads 1211 to 1215 at the first to third levels indicated by a thin line in FIG. 12 in the first partial path searching process. Then, a partial path 1221 indicated by a dotted line in FIG. 12 is obtained as a partial path that establishes a connection between the departure point 1201 and an exit and entrance 1241 at the expressway 1231 at the fourth level indicated by a bold line in FIG. 12. Moreover, as illustrated in FIG. 13, a path is searched for from the roads 1301 to 1304 at first to third levels indicated by a thin line in FIG. 13 in the second partial path searching process. Then, a partial path 1311 indicated by a dotted line in FIG. 13 is obtained as a partial path that establishes a connection between the destination point 1202 and an exit and entrance 1331 at the expressway 1321 at the fourth level indicated by a bold line in FIG. 13.

Figure 14:
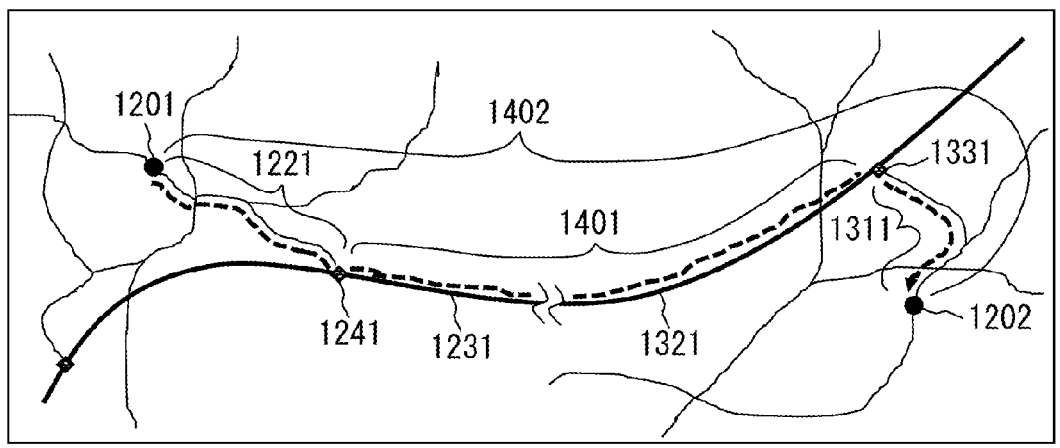
FIG. 14 illustrates a path search at the highest level in a long-range search.

Next, in the highest level path searching process, as illustrated in FIG. 14, a path 1402 indicated by a dotted line in FIG. 14 is obtained as a path from the departure point 1201 to the destination point 1202 passing through the partial path 1221, the expressways 1231 and 1321, and the partial path 1311.

In the switching search process of FIGS. 6 through 8, the highest level and the one or more next highest levels of roads may be used instead of roads at the highest level. In such cases, a path is searched for from two or more levels of roads in the highest level path searching process of FIG. 8.

In the switching search process of FIGS. 6 through 8, m partial paths that establish connections between the destination point and a road at the highest level are obtained after n partial paths that establish connections between the departure point and a road at the highest level are obtained. However, a different partial path searching method may be used. For example, a partial path may be searched for in an alternate manner between the departure point side and the destination point side. In this method, a partial path that establishes a connection between the departure point and a road at the next higher level is searched for and then a partial path that establishes a connection between the destination point and a road at the next higher level is searched for, and this is followed by returning to a partial path search on the departure point side again, and a similar process is repeated. Alternatively, n partial paths that establish connections between the departure point and a road at the highest level may be obtained after m partial paths that establish connections between the destination point and a road at the highest level are obtained.

Figure 15:
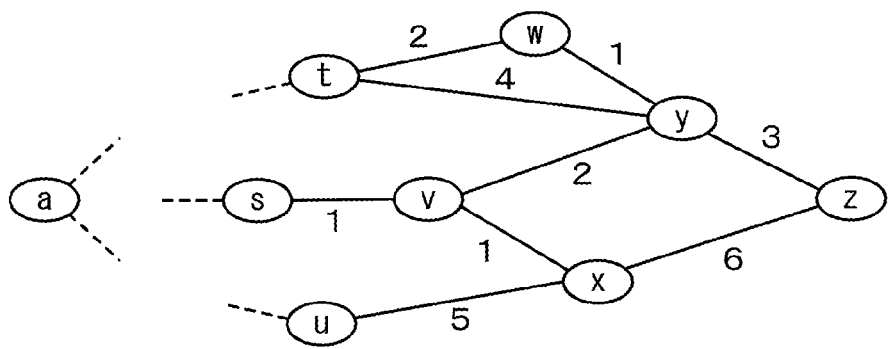
FIG. 15 illustrates a road network.

Note that a path search in which the destination point and departure point are handled as a beginning node and end node is performed in the second partial path searching process, which is different from the first partial path searching process. For example, supposing that the departure point and destination point are handled as node a and node z in the road network as illustrated in FIG. 15, a path is searched for from the node z to the node a, and partial paths that establish connections with a node s, t, u, or w on a road at the highest level via a node x, y, or v are searched for. Then, m partial paths are obtained from partial paths that establish connections with a node on a road at the highest level in ascending order of the cost value.

The values of the road link cost between nodes in FIG. 15 are as follows.

Road link between node t and node w: 2
Road link between node w and node y: 1
Road link between node t and node y: 4
Road link between node s and node v: 1
Road link between node v and node y: 2
Road link between node v and node x: 1
Road link between node u and node x: 5
Road link between node y and node z: 3
Road link between node x and node z: 6

For example, when Dijkstra's algorithm is adopted with m=3, three candidate paths as depicted in FIG. 16 are obtained as partial paths. A candidate path "z-y-w" is a partial path that establishes a connection between the node z and the node w via the node y, and its cost value is "3+1=4". A candidate path "z-y-v-s" is a partial path that establishes a connection between the node z and the node s via the nodes y and v, and its cost value is "3+2+1=6". A candidate path "z-y-t" is a partial path that establishes a connection between the node z and the node t via the node y, and its cost value is "3+4=7".

In such cases, when a path that connects to the nodes w, s, and t at which any of the candidate paths of FIG. 16 connects to a road at the highest level is found in the highest level path searching process, that node is added to the open list.

After that, the search in the section between the nodes w, s, and t and z proceeds on the road network composed of the nodes and links included in the candidate paths listed in FIG. 16, i.e., the road network composed of the nodes z, y, w, v, s, and t and the links z-y, y-w, y-v, v-s, and y-t. Note that the search is performed for the entire network in which the above section is connected to a section of roads at the highest level. Even if any one of w, s, t is reached by any search on roads at the highest level, the search on roads at the highest level is not terminated.

Also in the first partial path searching process, a path search in which the departure point and destination point are handled as a beginning node and end node is performed in a similar manner, and n partial paths are obtained from partial paths that establish connections with a node on a road at the highest level in ascending order of the cost value. The obtained partial paths are used as candidate paths in the highest level path searching process.

Next, the process of setting an area to be searched in step 502 of FIG. 5 will be explained with reference to FIGS. 17 through 26.

Figure 17:
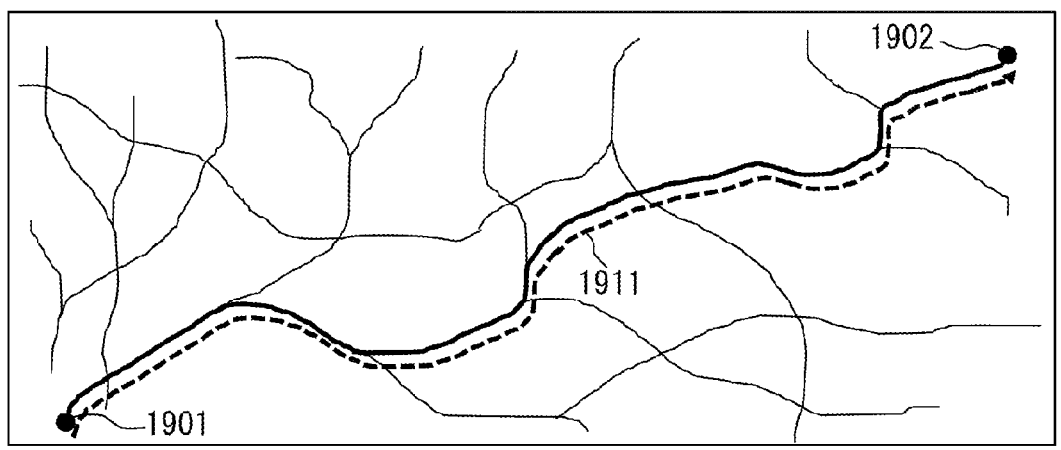
FIG. 17 illustrates a path obtained by the first switching search process.
Figure 18:
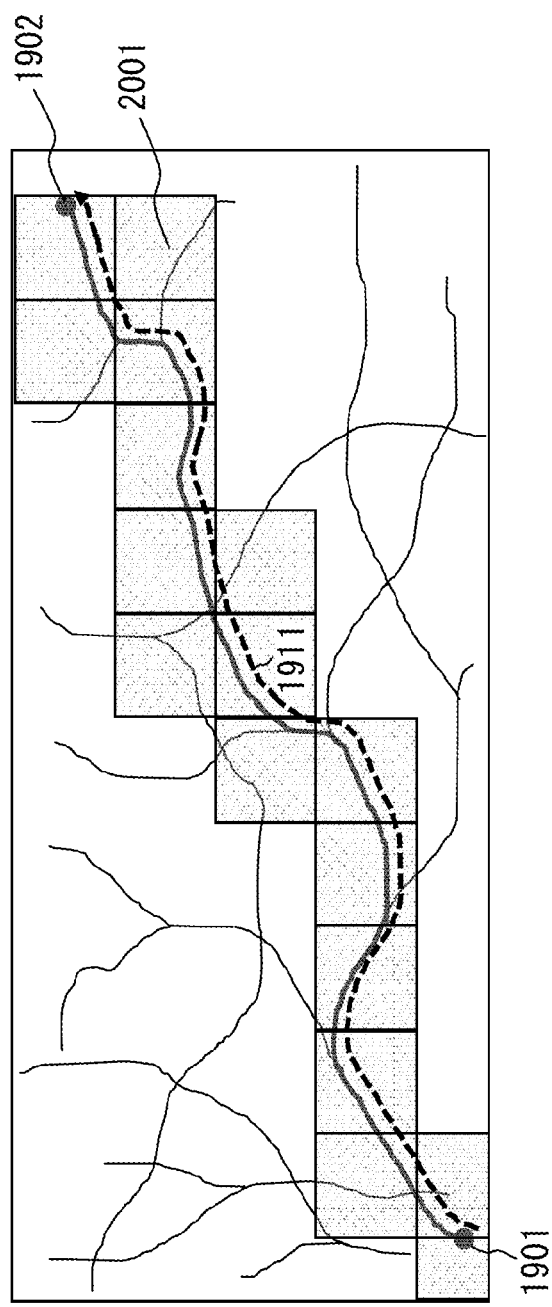
FIG. 18 illustrates an area including the path obtained by the first switching search process.

On the map information, when a rectangular area that includes a departure point and a destination point is divided into two or more partial areas, the number of partial areas that includes (covers) one path is generally less than the number of partial areas in the entirety of the rectangular area. Note that the rectangular area is set to include the departure point and the destination point and to generally include a path that connects the departure point with the destination point. Here, the idea of limiting the area to be searched by using the properties of the map information will be considered. For example, when the rectangular area that includes the departure point and the destination point is divided into meshes and the path 1911 as indicated by a dotted line in FIG. 17 is obtained in the first switching search process, as illustrated in FIG. 18, an area 2001 composed of only the partial areas that include the path 1911, which is highlighted in gray in FIG. 18, is specified.

Here, for the purpose of simplification, the process of setting an area to be searched which is performed in step 502 of FIG. 5 will be explained with reference to the example illustrated in FIG. 19. The rectangular area of FIG. 19 includes the departure point 2101 and the destination point 2102, and is divided into meshes in the latitude direction (Y-direction) and longitude direction (X-direction). The path 2111 indicates a path obtained in the first switching search process in step 501 of FIG. 5.

Figure 22:
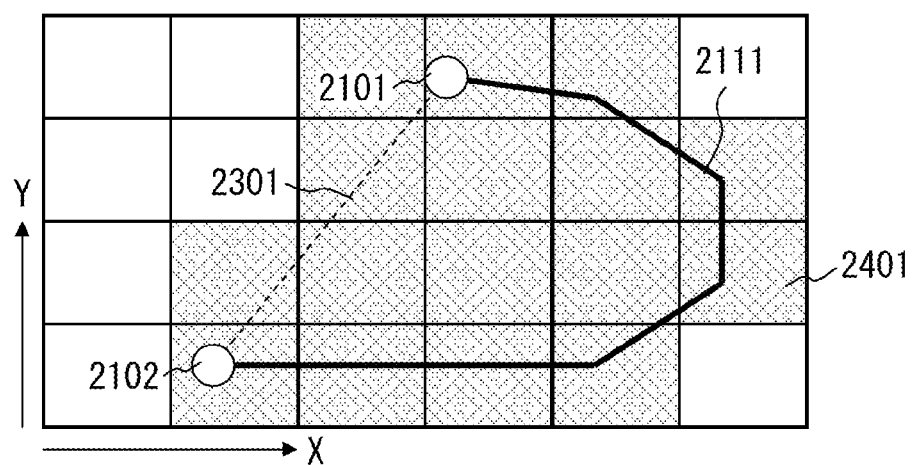
FIG. 22 illustrates the third area to be searched.

The setting unit 202 divides meshes (rectangular partial areas) of FIG. 19 into even finer meshes according to a specified number of partitions. The number of partitions is included in the operational parameters that are stored in the operational parameter storage unit 204. For example, when the number of partitions in the X-direction and Y-direction are both two, the division result becomes as illustrated in FIG. 22. Here, the following variations are possible as a method for setting an area to be searched.

(1) An area 2201 composed of the meshes that include the path 2111, which is highlighted in gray, is set to an area to be searched. (FIG. 20)

Figure 21:
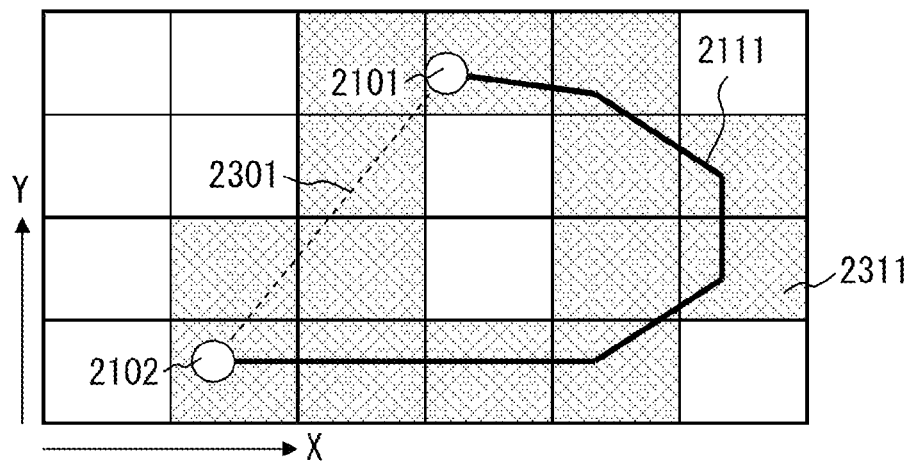
FIG. 21 illustrates the second area to be searched.

(2) An area 2311 highlighted in gray in FIG. 21 is set to an area to be searched, which combines an area composed of the meshes that include the path 2111, and an area composed of the meshes that include the line segment 2301 which connects the departure point 2101 with the destination point 2102. (FIG. 21)

(3) An area 2401 highlighted in gray in FIG. 22 is to an area to be searched, which combines an area composed of the meshes that include the path 2111, an area composed of the meshes that include the line segment 2301 that connects the departure point 2101 with the destination point 2102, and an area surrounded by the path 2111 and the segment 2301. (FIG. 22)

Which area to be searched is to be adopted among (1)-(3) above is designated by an operational parameter. As an area to be searched becomes broader, the path accuracy improves but the processing time becomes longer. As an area to be searched becomes narrower, the path accuracy degrades but the processing time becomes shorter. Given these circumstances, an area to be searched may be varied according to the distance between the departure point 2101 and the destination point 2102. For example, a range scale that corresponds to one of the search methods in FIG. 4A may be further divided into three, and then an area to be searched may be set such that the area to be searched becomes broader as the distance between a departure point and a destination point is shorter.

Further, an expanded area for each of the areas (1)-(3) above may be set to an area to be searched. In these cases, the direction of expansion and the degree of expansion may be designated with meshes as an expansion target. The degree of expansion indicates the number of meshes that are added in the direction of expansion.

Figure 23:
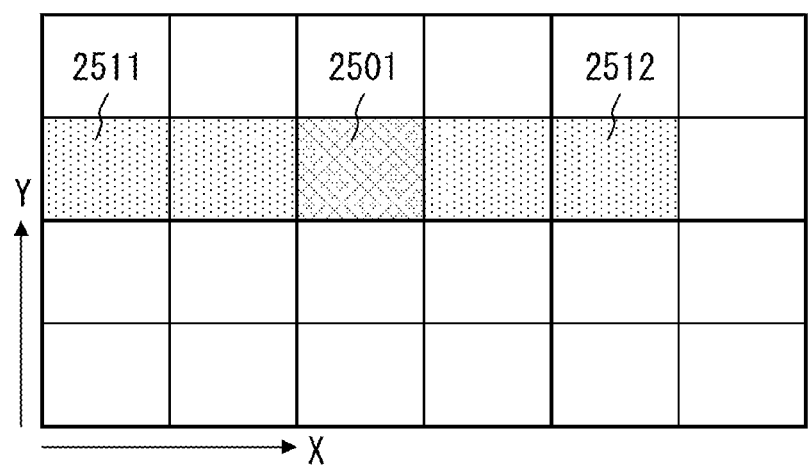
FIG. 23 illustrates the first expanded portion for a mesh.
Figure 24:
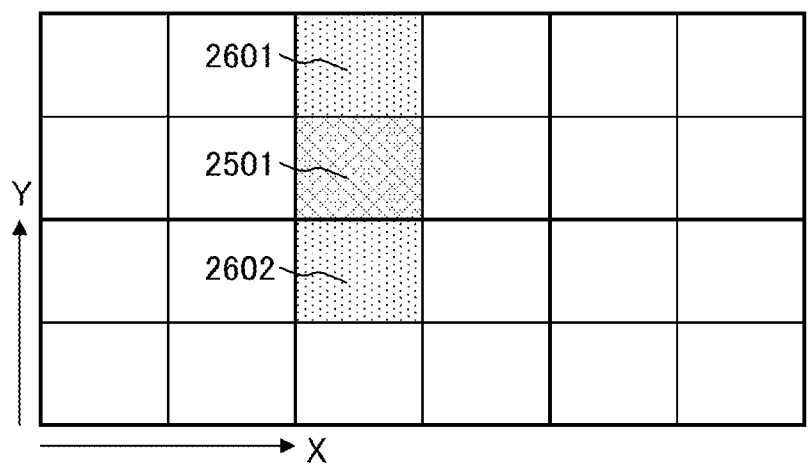
FIG. 24 illustrates the second expanded portion for a mesh.
Figure 25:
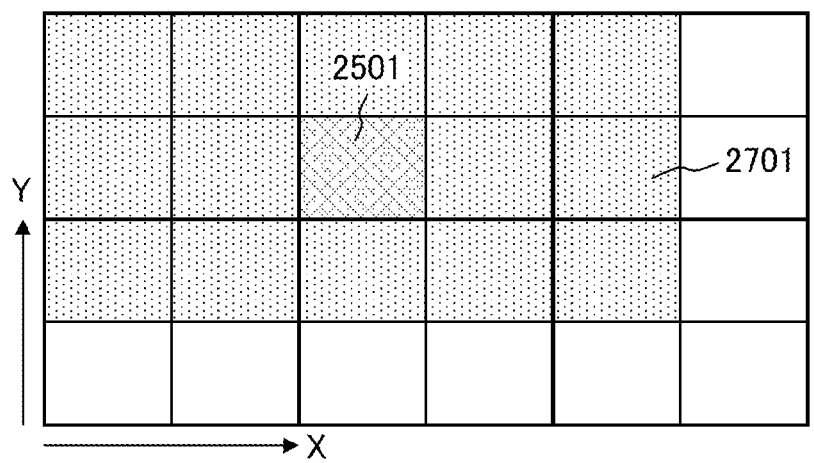
FIG. 25 illustrates the third expanded portion for a mesh.

For example, if it is assumed that a mesh 2501 in FIG. 23 is an expansion target and that the degrees of expansion in the X-direction and Y-direction are 2 and 0, respectively, a left area 2511 and a right area 2512 are added as expanded portions in the mesh 2501. In FIG. 23, the expanded portions are highlighted in pale gray. If it is assumed that the degrees of expansion in the X-direction and Y-direction are 0 and 1, respectively, as illustrated in FIG. 24, an upper area 2601 and a lower area 2602 are added as expanded portions in the mesh 2501. In FIG. 24, the expanded portions are highlighted in pale gray. Moreover, if it is assumed that the degrees of expansion in the X-direction and Y-direction are 2 and 1, respectively, as illustrated in FIG. 25, an area 2701 around the mesh 2501 is added as an expanded portion. In FIG. 25, the expanded portion is highlighted in pale gray.

Figure 26:
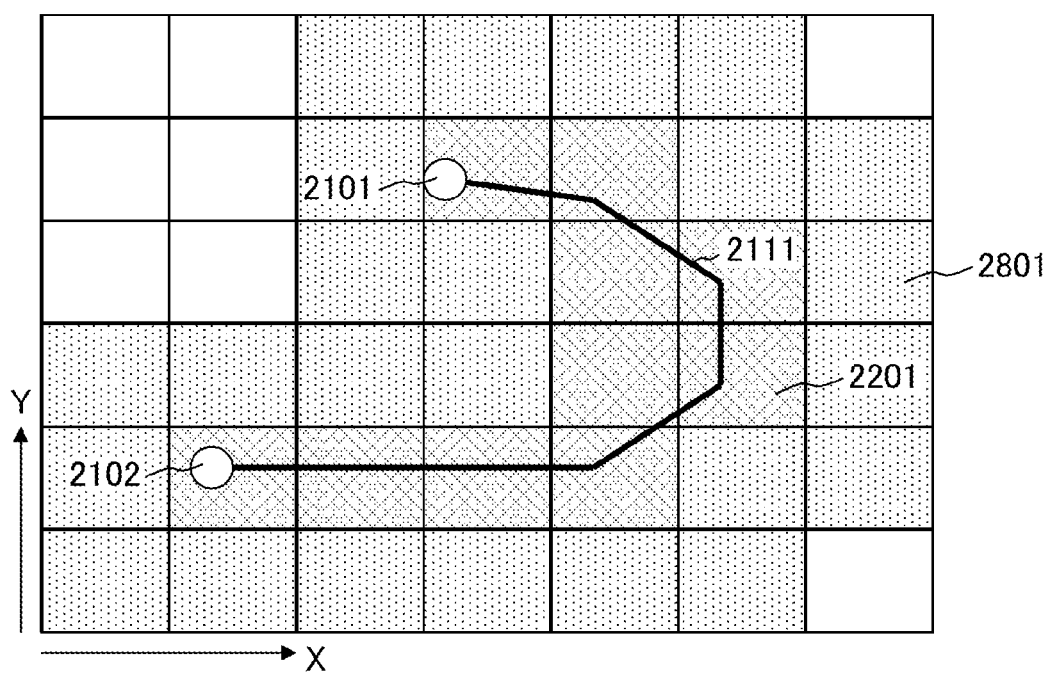
FIG. 26 illustrates the expanded area to be searched.

FIG. 26 illustrates the expanded area to be searched where each of the meshes included in the area 2201 of FIG. 20 is an expansion target and the degrees of expansion in the X-direction and Y-direction are both one. In this case, an area 2801 highlighted in pale gray around the area 2201 highlighted in gray in FIG. 25 is added as an expanded portion. Whether or not an area to be searched should be expanded, and the direction of expansion and the degree of expansion are designated by operational parameters. The direction of expansion and the degree of expansion may be designated such that the expanded portion will become broader as the distance between a departure point and a destination point is shorter.

In each of the search methods of FIG. 4A, it is also possible for a user to decide whether or not to use expressways. In this case, the terminal 101 transmits to a path search system the usability information that indicates use or non-use of expressways in the respective very-close-range search, close-range search, medium-range search, and long-range search. Then, the path search devices 105-1 to 105-4 store the usability information in the operational parameter storage unit 204, and the search unit 201 performs a path search in which expressways are excluded in the corresponding search method when the usability information indicates non-use.

When the non-use of expressways is designated in the long-range search, the search method may be changed to the medium-range search.

Note that the flowcharts in FIGS. 5 through 8 are illustrated merely as an example, and some of the processes may be omitted or modified according to the configuration or condition of a path search system. Another method other than Dijkstra's algorithm or an A* algorithm may be adopted as a path searching algorithm. For example, algorithms such as the branch and bound, hill-climbing, and best-first search may be used.

Alternatively, roads may be classified according to the attributes such as the length or width of the roads, and upper-limit traveling speed rather than classifying the roads according to the type of road. When the roads are classified according to the length of the roads, a longer road is classified as a higher level. When the roads are classified according to the width of the roads, a wider road is classified as a higher level. When the roads are classified according to the upper-limit traveling speed of the roads, a road whose upper-limit traveling speed is higher is classified as a higher level. In all cases, as the level of a road gets higher, a grouping is adopted in which a motor vehicle can travel more easily.

Figure 27:
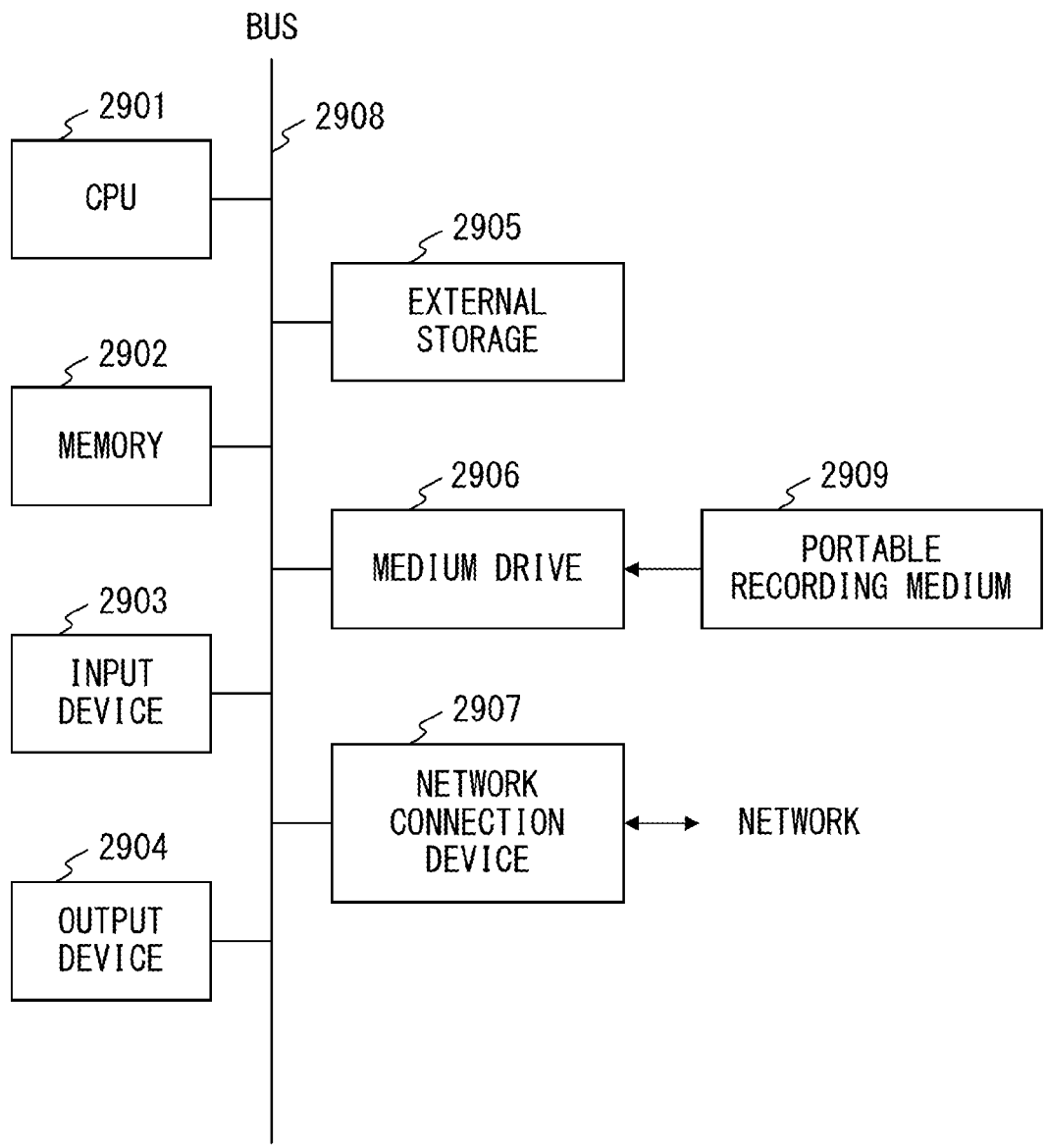
FIG. 27 is a block diagram of an information processing apparatus.

The terminal 101, the interface 103, the load balancer 104, the path search devices 105-1 to 105-4, the map information database 106, and the traffic information database 107 of FIG. 1 may be realized, for example, by using an information processing apparatus (computer) as depicted in FIG. 27.

The information processing apparatus of FIG. 27 is provided with a central processing unit (CPU) 2901, a memory 2902, an input device 2903, an output device 2904, an external storage 2905, a medium drive 2906, and a network connection device 2907. These elements are connected with each other through a bus 2908.

The memory 2902 is, for example, a semiconductor memory such as a read-only memory (ROM), a random access memory (RAM), or a flash memory, and the memory 2902 stores the program and data that are used in the processing. For example, the CPU 2901 (processor) may use the memory 2902 to execute a program, thereby performing the processes of the terminal 101, the interface 103, the load balancer 104, and the path search devices 105-1 to 105-4.

When the information processing apparatuses are used as the path search devices 105-1 to 105-4, the memory 2902 may be used as the operational parameter storage unit 204 of FIG. 2, and may also store the map information, the traffic information, and the open list.

The input device 2903 is, for example, a keyboard, a pointing device, or the like, and is used by a user or operator for giving instructions or inputting information. The output device 2904 is, for example, a display device, a printer, a speaker, or the like, and is used for making inquiries to a user or operator or outputting a processing result. The processing result at the terminal 101 includes a screen on which a path indicated by the path information is displayed.

The external storage 2905 may be, for example, a magnetic disk device, an optical disk device, a magneto-optic disk device, or a tape device. The external storage 2905 may be a hard disk drive. The information processing apparatus may store programs and data in the external storage 2905, and may use the stored programs and data by loading them into the memory 2902.

When the information processing apparatus is used as the map information database 106 or the traffic information database 107, the external storage 2905 stores the map information or traffic information.

The medium drive 2906 drives the portable recording medium 2909 to access the recorded contents. The portable recording medium 2909 may be a memory device, a flexible disk, optical disk, a magneto-optic disk, or the like. The portable recording medium 2909 may be a compact disc read-only memory (CD-ROM), a digital versatile disc (DVD), a universal serial bus (USB) memory, or the like. A user or operator may store programs and data in the portable recording medium 2909, and may use the stored programs and data by loading them into the memory 2902.

As described above, a computer-readable recording medium in which a program and data used for various processes are stored may include a physical (non-transitory) recording medium such as the memory 2902, the external storage 2905, and the portable recording medium 2909.

The network connection device 2907 is a communication interface that is connected to a communication network such as the Local Area Network (LAN), the Internet, or the like, and that performs data conversion involved in the communication. The information processing apparatus may receive a program and data from an external device through the network connection device 2907, and may use the received program or data by loading it into the memory 2902.

It is not necessary for the information processing apparatus to include all the elements of FIG. 27, but some of the elements may be omitted according to their use or condition. For example, when the information processing apparatus is used as the interface 103, the load balancer 104, the path search devices 105-1 to 105-4, the map information database 106, or the traffic information database 107, the input device 2903 and the output device 2904 may be omitted.

The interface 103, the load balancer 104, the path search devices 105-1 to 105-4, the map information database 106, or the traffic information database 107 of FIG. 1 may be individually implemented on information processing apparatuses that are connected so as to enable communication with each other, or may be implemented on a single information processing apparatus. An operator of the system may decide the number of information processing apparatuses with which the processing units in FIG. 1 other than the terminal 101 are implemented.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. A path searching method performed by a computer, the path searching method comprising:
according to a first grouping in which a plurality of road types are classified into a plurality of levels from a lowest level to a highest level, performing, by using a processor, a first path search directed from a departure point to a destination point for a road type at a level other than the highest level, which is repeated until a node of a road type at the highest level is reached while changing a search target from a road type at a lower level to a road type at a higher level, and a second path search directed from the destination point to the departure point for a road type at a level other than the highest level, which is repeated until a node of the road type at the highest level is reached while changing a search target from a road type at a lower level to a road type at a higher level;
performing, by using the processor, a third path search for the road type at the highest level according to the node obtained in the first path search and the node obtained in the second path search;
setting an area to be searched according to a result of the first path search, the second path search, and the third path search;
according to a second grouping in which a number of road types classified into the highest level is greater than a number of road types classified into the highest level in the first grouping, performing, by using the processor, a fourth path search directed from the departure point to the destination point for a road type at a level other than the highest level in the area to be searched, which is repeated until a node of a road type at the highest level is reached while changing a search target from a road type at a lower level to a road type at a higher level, and a fifth path search directed from the destination point to the departure point for a road type at a level other than the highest level in the area to be searched, which is repeated until a node of the road type at the highest level is reached while changing a search target from a road type at a lower level to a road type at a higher level;
performing, by using the processor, a sixth path search for the road type at the highest level in the area to be searched according to the node obtained in the fourth path search and the node obtained in the fifth path search; and
generating path information according to a result of the fourth path search, the fifth path search, and the sixth path search.

2. The path searching method according to claim 1, wherein
the setting the area to be searched includes setting to the area to be searched an area that includes a path indicated by the result of the first path search, the second path search, and the third path search.

3. The path searching method according to claim 1, wherein
the setting the area to be searched includes setting to the area to be searched an area that includes a path indicated by the result of the first path search, the second path search, and the third path search, and an area including a straight line that connects the departure point with the destination point.

4. The path searching method according to claim 1, wherein
the setting the area to be searched includes setting to the area to be searched an area that includes a path indicated by the result of the first path search, the second path search, and the third path search, an area including a straight line that connects the departure point with the destination point, and an area surrounded by the path and the straight line.

5. A path search device comprising:
a processor including a non-transitory computer-readable medium, that
performs, according to a first grouping in which a plurality of road types are classified into a plurality of levels from a lowest level to a highest level, a first path search directed from a departure point to a destination point for a road type at a level other than the highest level, which is repeated until a node of a road type at the highest level is reached while changing a search target from a road type at a lower level to a road type at a higher level, and a second path search directed from the destination point to the departure point for a road type at a level other than the highest level, which is repeated until a node of the road type at the highest level is reached while changing a search target from a road type at a lower level to a road type at a higher level;

performs a third path search for the road type at the highest level according to the node obtained in the first path search and the node obtained in the second path search;

sets an area to be searched according to a result of the first path search, the second path search, and the third path search;

performs, according to a second grouping in which a greater number of road types than that of the road types at the highest level in the first grouping is classified as the highest level in the second grouping, a fourth path search directed from the departure point to the destination point for a road type at a level other than the highest level in the area to be searched, which is repeated until a node of a road type at the highest level is reached while changing a search target from a road type at a lower level to a road type at a higher level, and a fifth path search directed from the destination point to the departure point for a road type at a level other than the highest level in the area to be searched, which is repeated until a node of the road type at the highest level is reached while changing a search target from a road type at a lower level to a road type at a higher level;

performs a sixth path search for the road type at the highest level in the area to be searched according to the node obtained in the fourth path search and the node obtained in the fifth path search; and generates path information according to a result of the fourth path search, the fifth path search, and the sixth path search.

6. A non-transitory computer-readable recording medium having stored therein a program for causing a computer to execute a process comprising:

according to a first grouping in which a plurality of road types are classified into a plurality of levels from a lowest level to a highest level, performing a first path search directed from a departure point to a destination point for a road type at a level other than the highest level, which is repeated until a node of a road type at the highest level is reached while changing a search target from a road type at a lower level to a road type at a higher level, and performing a second path search directed from the destination point to the departure point for a road type at a level other than the highest level, which is repeated until a node of the road type at the highest level is reached while changing a search target from a road type at a lower level to a road type at a higher level;

performing a third path search for the road type at the highest level according to the node obtained in the first path search and the node obtained in the second path search;

setting an area to be searched according to a result of the first path search, the second path search, and the third path search;

according to a second grouping in which a greater number of road types than that of the road types at the highest level in the first grouping is classified as the highest level in the second grouping, performing a fourth path search directed from the departure point to the destination point for a road type at a level other than the highest level in the area to be searched, which is repeated until a node of a road type at the highest level is reached while changing a search target from a road type at a lower level to a road type at a higher level, and performing a fifth path search directed from the destination point to the departure point for a road type at a level other than the highest level in the area to be searched, which is repeated until a node of the road type at the highest level is reached while changing a search target from a road type at a lower level to a road type at a higher level;

performing a sixth path search for the road type at the highest level in the area to be searched according to the node obtained in the fourth path search and the node obtained in the fifth path search; and generating path information according to a result of the fourth path search, the fifth path search, and the sixth path search.

* * * * *